(12) United States Patent
Watanabe et al.

(10) Patent No.: US 8,510,044 B2
(45) Date of Patent: Aug. 13, 2013

(54) POSITION SENSING DEVICE AND METHOD

(75) Inventors: Takayuki Watanabe, Iwaki (JP); Takayuki Hoshizaki, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1220 days.

(21) Appl. No.: 12/166,062

(22) Filed: Jul. 1, 2008

(65) Prior Publication Data

US 2009/0018772 A1 Jan. 15, 2009

(30) Foreign Application Priority Data

Jul. 12, 2007 (JP) ................................. 2007-182818

(51) Int. Cl.
*G01C 21/12* (2006.01)

(52) U.S. Cl.
USPC ........................................................ 701/472

(58) Field of Classification Search
USPC ......................................... 701/221, 214, 472
See application file for complete search history.

(56) References Cited

U.S. PATENT DOCUMENTS

| | | | |
|---|---|---|---|
| 5,276,451 A | 1/1994 | Odagawa | |
| 5,394,333 A * | 2/1995 | Kao | 701/445 |
| 5,745,868 A * | 4/1998 | Geier | 701/472 |
| 5,774,829 A * | 6/1998 | Cisneros et al. | 701/475 |
| 6,226,591 B1 * | 5/2001 | Okumura et al. | 701/409 |
| 6,407,701 B2 | 6/2002 | Ito et al. | |
| 6,408,244 B2 * | 6/2002 | Ito | 701/213 |
| 6,658,353 B2 * | 12/2003 | Shimizu et al. | 701/214 |
| 6,735,523 B1 * | 5/2004 | Lin et al. | 701/470 |
| 6,785,609 B2 * | 8/2004 | Suda | 701/472 |
| 6,801,855 B1 * | 10/2004 | Walters et al. | 701/410 |
| 7,245,215 B2 * | 7/2007 | Gollu et al. | 340/539.13 |
| 7,305,303 B2 * | 12/2007 | Soehren et al. | 701/472 |
| 7,702,459 B2 * | 4/2010 | Hoshizaki | 701/478.5 |
| 8,433,514 B1 * | 4/2013 | Zhi et al. | 701/472 |
| 2002/0158796 A1 * | 10/2002 | Humphrey et al. | 342/357.14 |
| 2004/0172173 A1 * | 9/2004 | Goto et al. | 701/1 |
| 2005/0216146 A1 * | 9/2005 | Bauer et al. | 701/29 |
| 2005/0216154 A1 * | 9/2005 | Lehmann et al. | 701/38 |
| 2008/0071476 A1 * | 3/2008 | Hoshizaki | 701/214 |

FOREIGN PATENT DOCUMENTS

| | | |
|---|---|---|
| JP | 01-316607 | 12/1989 |
| JP | 05-019036 | 1/1993 |
| JP | 08-297033 | 11/1996 |

(Continued)

*Primary Examiner* — Valerie Lubin
*Assistant Examiner* — Anita Coupe
(74) *Attorney, Agent, or Firm* — Brinks Hofer Gilson & Lione

(57) ABSTRACT

A position sensing device and method are provided for executing correction processing based on a reliability and error index of each component of GPS output data to increase positioning accuracy. Correction processing is performed to correct a position determination result obtained through dead reckoning, and a vehicle speed, a pitch angle, and a sensor mounting angle used in position determination executed through dead reckoning in a measurement period of GPS in accordance with direction-specific positional components and speed components of a vehicle, which are measured with GPS to determine a reliability of each of the direction-specific positional components and speed components of the vehicle and calculate an error index of a component determined to be a reliable component, to set the degree of contribution of a measurement component determined to be unreliable to correction processing to zero or almost zero, and to reduce the degree of contribution of a measurement component determined to be reliable to correction processing in accordance with a value of the error index.

10 Claims, 26 Drawing Sheets

(56) References Cited

FOREIGN PATENT DOCUMENTS

| | | |
|---|---|---|
| JP | 8-334338 | 12/1996 |
| JP | 09-196691 | 7/1997 |
| JP | 11-094573 | 4/1999 |
| JP | 11-149326 | 6/1999 |
| JP | 2001-337150 | 12/2001 |
| JP | 2007-064853 | 3/2007 |
| JP | 2008-275530 | 11/2008 |

* cited by examiner

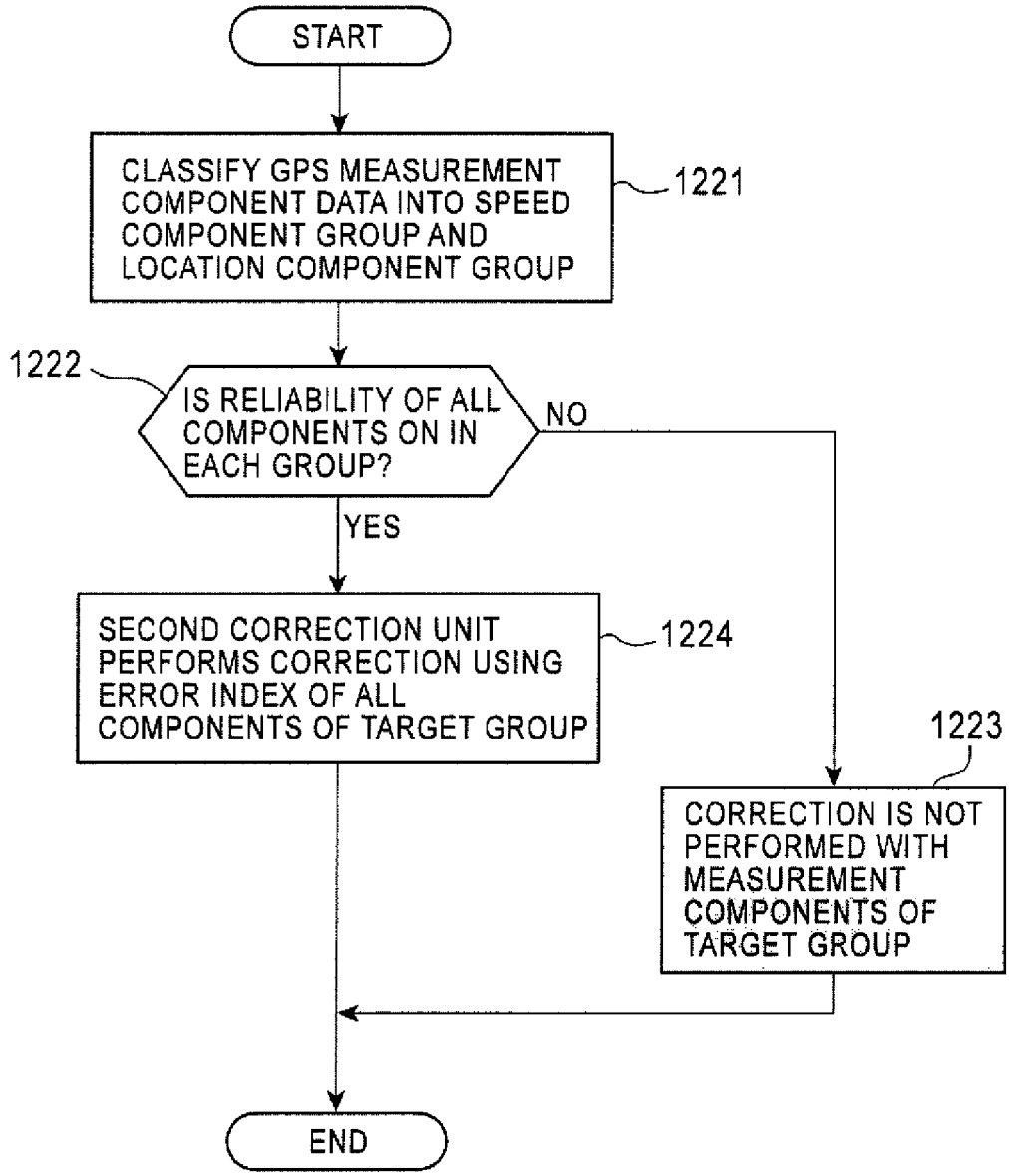

FIG. 26
F

| δx(k) →<br>δx(k+1) ↓ | 0<br>δN | 1<br>δE | 2<br>δD | 3<br>δVbx | 4<br>δc00 | 5<br>δc10 | 6<br>δc20 | 7<br>δp00 | 8<br>δp10 | 9<br>δp20 | 10<br>bwz | 11<br>bax |
|---|---|---|---|---|---|---|---|---|---|---|---|---|
| 0 δN(k+1) | 1 | 0 | 0 | 0 | $N_pL(p_{00}-c_{20}C_0p_{02})$ | $N_pL(-C_0p_{01})$ | $N_pL(-c_{10}c_{20}C_1p_{01}-c_{00}C_1p_{02})$ | $N_pL(c_{00}-p_{20}P_0c_{02})$ | $N_pL(-P_0c_{01})$ | $N_pL(-p_{10}p_{20}P_1c_{01}-p_{00}P_1c_{02})$ | 0 | 0 |
| 1 δE(k+1) | 0 | 1 | 0 | 0 | $N_pL(C_0p_{01})$ | $N_pL(p_{00}-c_{20}C_0p_{02})$ | $N_pL(c_{00}c_{20}C_0p_{01}-c_{10}C_1p_{02})$ | $N_pL(c_{10}-p_{20}P_0c_{12})$ | $N_pL(-P_0c_{11})$ | $N_pL(-p_{10}p_{20}P_1c_{11}-p_{00}P_1c_{12})$ | 0 | 0 |
| 2 δD(k+1) | 0 | 0 | 1 | 0 | 0 | 0 | $N_pL(p_{00}-c_{20}C_0p_{02})$ | $N_pL(c_{20}-p_{20}P_0c_{22})$ | 0 | $N_pL(-p_{00}p_{20}P_1c_{22})$ | 0 | 0 |
| 3 δVbx(k+1) | 0 | 0 | 0 | $1+\frac{1}{P_{00}}\omega_{sz}$<br>$p_{01}T$ | 0 | 0 | $\frac{1}{P_{00}}g_DT$ | $-\frac{1}{P_{00}}v_{bx}T$ | $\frac{1}{P_{00}}\omega_{sz}v_{bx}$<br>$P_0T$ | $\frac{1}{P_{00}}\omega_{sz}v_{bx}$<br>$p_{10}p_{20}P_1T$ | $\frac{1}{P_{00}}v_{bx}$<br>$p_{01}T$ | $\frac{1}{P_{00}}T$ |
| 4 δc00(k+1) | 0 | 0 | 0 | 0 | 1 | $-C_0\omega_{sz}T$ | $-c_{10}c_{20}\omega_{sz}C_1T$ | 0 | 0 | 0 | $c_{01}T$ | 0 |
| 5 δc10(k+1) | 0 | 0 | 0 | 0 | $C_0\omega_{sz}T$ | 1 | $c_{00}c_{20}C_1\omega_{sz}$ | 0 | 0 | 0 | $c_{11}T$ | 0 |
| 6 δc20(k+1) | 0 | 0 | 0 | 0 | 0 | 0 | 1 | 0 | 0 | 0 | 0 | 0 |
| 7 δp00(k+1) | | | | | | | | 1 | 0 | 0 | 0 | 0 |
| 8 δp10(k+1) | | | | | | | | 0 | 1 | 0 | 0 | 0 |
| 9 δp20(k+1) | | | | | | | | 0 | 0 | 1 | 0 | 0 |
| 10 bwz(k+1) | | | | | | | | | | | 1 | 0 |
| 11 bax(k+1) | | | | | | | | | | | | 1 |

$C_0 = \frac{1}{\sqrt{1-c_{20}^2}}$   $C_1 = \frac{1}{(1-c_{20}^2)^{3/2}}$   $P_0 = \frac{1}{\sqrt{1-p_{20}^2}}$   $P_1 = \frac{1}{(1-p_{20}^2)^{3/2}}$ T = SAMPLE PERIOD (0.04 SECOND AT 25 Hz)   $N_p$ = THE NUMBER OF SPEED PULSES PER SAMPLE PERIOD   $\omega_{sz}$ = GYRO OUTPUT   $g_c$ = 9.8m/s²: GRAVITATIONAL ACCELERATION   L = INTERPULSE DISTANCE

| δz(k) \ δx(k) | 1 δN | 2 δE | 3 δD | 4 δvbx | 5 δc00 | 6 δc10 | 7 δc20 | 8 δp00 | 9 δp10 | 10 δp20 | 11 bwz | bax |
|---|---|---|---|---|---|---|---|---|---|---|---|---|
| (1) δvbx | 0 | 0 | 0 | 1 | 0 | 0 | 0 | 0 | 0 | 0 | 0 | 0 |
| (2) bwz | 0 | 0 | 0 | 0 | 0 | 0 | 0 | 0 | 0 | 0 | 1 | 0 |
| δN | 1 | | | | | | | | | | | |
| δE | | 1 | | | | | | | | | | |
| δD | | | 1 | | | | | | | | | |
| (3) δvnx | 0 | 0 | 0 | $c_{00}p_{00}+c_{01}p_{01}+c_{02}p_{02}$ | $v_{bx}(p_{00}-c_{20}c_0p_{02})$ | $v_{bx}(-c_{10}c_{20}c_1p_{01}-c_{00}c_1p_{02})$ | $v_{bx}(c_{00}-p_{20}p_0c_{02})$ | $v_{bx}(-p_0c_{01})$ | $v_{bx}(-p_{10}p_{20}p_1c_{01}-p_{00}p_1c_{02})$ | 0 | 0 |
| δvny | 0 | 0 | 0 | $c_{10}p_{00}+c_{11}p_{01}+c_{12}p_{02}$ | $v_{bx}(c_0p_{01})$ | $v_{bx}(c_{00}c_{20}c_1p_{01}-c_{10}c_1p_{02})$ | $v_{bx}(c_{10}-p_{20}p_0c_{12})$ | $v_{bx}(-p_0c_{11})$ | $v_{bx}(-p_{10}p_{20}p_1c_{11}-p_{00}p_1c_{12})$ | 0 | 0 |
| δvnz | 0 | 0 | 0 | $c_{20}p_{00}+c_{22}p_{02}$ | 0 | $v_{bx}(p_{00}-c_{20}c_0p_{02})$ | $v_{bx}(c_{20}-p_{20}p_0c_{22})$ | 0 | $v_{bx}(-p_{00}p_1c_{22})$ | 0 | 0 |

POSITION SENSING DEVICE AND METHOD

BACKGROUND OF THE INVENTION

1. Related Application

The present application claims priority to Japanese Patent Application Number 2007-182818, filed Jul. 12, 2007, the entirety of which is hereby incorporated by reference

2. Field of the Invention

The present invention relates to a position sensing device and method for detecting a current position of a vehicle, and more specifically to a position sensing device and method capable of increasing the accuracy of a dead reckoning position.

3. Description of the Related Art

An in-vehicle navigating system employs both dead reckoning with a dead reckoning sensor and GPS (global positioning system) navigation with a GPS receiver.

Dead reckoning is a technique of detecting a vehicles position, orientation, and speed using an output of an acceleration sensor for detecting an acceleration of a vehicle, a relative direction sensor (gyro, etc.) for detecting a change in vehicle direction, and a distance sensor (speed sensor, etc.) for detecting a vehicle speed (distance over time). However, output data (position, orientation, speed vehicle, etc.) of the dead reckoning sensor includes an error in sensor measurement, so some error will occur. In particular, position and orientation are calculated by integrating an output value of the sensor, so an error is cumulatively increased. On the other hand, the GPS receiver can determine absolute values of a vehicle's position, orientation, and speed within the maximum positional error of about 30 m. Thus, if the output dead-reckoning position is adjusted to a position output from the GPS receiver upon receiving a GPS signal, the cumulative error can be corrected. For example, if a positional difference between a position determined with a GPS receiver and a dead reckoning position of a target vehicle to a position on any road on a road map based on any known map matching technique is larger than a predetermined value, the position on the road map is adjusted to the position determined with the GPS receiver.

The dead-reckoning position can be corrected in accordance with an output value of the OPS receiver as described above. However, dead reckoning has a problem that an error in dead reckoning cumulatively increases due to an error in sensor output value and sensor mounting angle when no GPS data is received, which deteriorates an output accuracy. In particular, a GPS signal cannot reach the navigation system in a vehicle in a multilevel parking structure or basement car park, and a positional error of about 100 m or less occurs. In addition, the navigation system often receives reflected GPS signals in an inner-city area. If multipath interference occurs, this interference involves a positional error of about 300 m or less.

Based on the above, a method of correcting an error in output sensor value to determine a current position has been proposed. A method disclosed in Japanese Unexamined Patent Application Publication No. 2001-337150 calculates an offset error, a distance factor error, an absolute orientation error, and an absolute position error through a Kalman filter process based on information about a vehicle's position, orientation, and speed measured through dead reckoning and information about the vehicle's position, orientation, and speed output from a GPS receiver, and corrects the errors.

To apply an output value of a GPS receiver (positional data and speed data in three directions, latitude, longitude, and height) to the Kalman filter process, it is necessary to determine an error index of each component of the output data of the GPS receiver (see Japanese Unexamined Patent Application Publication No. 2001-337150). However, the GPS receiver can only output an index of error with respect to a horizontal position. Thus, among the output data of the GPS receiver, data without an error index cannot be used for the Kalman filter process. As a result, the necessary error indexes are determined through simple calculation, but an accuracy of a position estimated with the thus-determined indexes is much lower than that estimated with correct indexes. In addition, an accuracy of output data of a conventional GPS receiver decreases due to an influence of multipath interference. In this case, an error index also becomes incorrect (an error should be large but a small value is output). In such cases, if the GPS output data is applied to the Kalman filter process, a position estimation accuracy considerably decreases.

To solve the above problem, a GPS receiver (available from u-blox) capable of outputting error indexes for all GPS output components is used. However, such a GPS receiver is costly and cannot be used. Here, a GPS navigation system that selectively uses GPS output data including fewer errors to increase a positioning accuracy is proposed (see Japanese Unexamined Patent Application Publication No. 8-334338). However, this system does not control the Kalman filter process based on an error value.

SUMMARY OF THE INVENTION

In view of the above circumstances, it is an object of some embodiments of the present invention to enable measurement data (positional data and speed data in three directions, vehicle's latitude, longitude, and height) of a GPS receiver not outputting an error index to be used in correction processing.

It is another object of some embodiments of the present invention to determine a reliability of each component of GPS output data and calculate an error index of a component determined to be a reliable component, to perform correction processing based on the determined reliability and the calculated error index.

It is another object of some embodiments of the present invention to determine a reliability of each component of GPS output data and set the degree of contribution of a component determined to be an unreliable component to the correction of the GPS output data to zero or almost zero to thereby increase positioning accuracy.

It is another object of some embodiments of the present invention to determine a reliability of each component of GPS output data and calculate an error index of a component determined to be a reliable component to reduce the degree of contribution to the correction processing in accordance with the error index to increase positioning accuracy.

It is another object of some embodiments of the present invention to cancel the correction processing if at least one of the measurement components is determined to be an unreliable component or perform the correction processing and reduce the degree of contribution of each measurement component to the correction processing in accordance with an error index if all measurement components are determined to be reliable.

It is another object of some embodiments of the present invention to divide measurement components into a speed component group and a position component group, and cancel the correction processing if at least one of the measurement components in each group is determined to be an unreliable component, and perform the correction processing and reduce the degree of contribution of each measurement component to the correction processing in accordance with an error index if all measurement components are determined to be a reliable component.

(Position Sensing Method)

According to a first aspect of the present invention, a position sensing method for detecting a current position of a vehicle is provided.

A position sensing method according to a first embodiment of the present invention includes: a step of determining a position of a vehicle by calculation based on dead reckoning at a predetermined cycle; a step of executing correction processing for correcting a position determination result obtained through dead reckoning and a vehicle speed, a pitch angle, and a sensor mounting angle used in the position determination executed through dead reckoning in accordance with direction-specific positional components and speed components of the vehicle, which are measured with a GPS receiver in a measurement period of the GPS receiver which is longer than the predetermined cycle; a step of determining a reliability of each of the direction-specific positional components and speed components of the vehicle, which are measured with the GPS receiver, and calculating an error index of a component determined to be a reliable component; and a step of setting the degree of contribution of a measurement component determined to be an unreliable component to the correction processing to zero or almost zero, and reducing the degree of contribution of a measurement component determined to be a reliable component to the correction processing in accordance with a value of the error index.

According to a second embodiment of the present invention, a position sensing method includes: a step of determining a position of a vehicle by calculation based on dead reckoning at a predetermined cycle; a step of executing correction processing for correcting a position determination result obtained through dead reckoning and a vehicle speed, a pitch angle, and a sensor mounting angle used in the position determination executed through dead reckoning in accordance with direction-specific positional components and speed components of the vehicle, which are measured with a GPS receiver in a measurement period of the GPS receiver which is longer than the predetermined cycle; a step of determining a reliability of each of the direction-specific positional components and speed components of the vehicle, which are measured with the GPS receiver, and calculating an error index of a component determined to be a reliable component; a step of executing control not to perform the correction processing if at least one of the measurement components is determined to be an unreliable component; and a step of executing the correction processing and reducing the degree of contribution of each measurement component to the correction processing in accordance with a value of the error index if all measurement components are determined to be a reliable component.

According to a third embodiment of the present invention, a position sensing method includes: a step of determining a position of a vehicle by calculation based on dead reckoning at a predetermined cycle; a step of executing correction processing for correcting a position determination result obtained through dead reckoning and a vehicle speed, a pitch angle, and a sensor mounting angle used in the position determination executed through dead reckoning in accordance with direction-specific positional components and speed components of the vehicle, which are measured with a GPS receiver in a measurement period of the GPS receiver which is longer than the predetermined cycle; a step of determining a reliability of each of the direction-specific positional components and speed components of the vehicle, which are measured with the UPS receiver, and calculating an error index of a component determined to be a reliable component; a step of, if GPS measurement components are divided into a speed component group and a positional component group, and at least one of the measurement components in a group is determined to be an unreliable component, executing control not to perform the correction processing by use of the measurement components in the group including the unreliable component; and a step of, if all measurement components in a target group are determined to be a reliable component, executing the correction processing by use of the measurement components in the target group and reducing the degree of contribution of each measurement component to the correction processing in accordance with a value of the error index.

The position sensing method according to the first, second, or third embodiment of the present invention further includes a step of measuring a vehicle speed using an output signal of a moving distance detecting sensor in a period longer than the predetermined cycle for dead reckoning and not longer than the GPS measurement period, and correcting the vehicle speed, the pitch angle, and the sensor mounting angle used in dead reckoning in accordance with a difference between the measured vehicle speed and the vehicle speed determined through dead reckoning.

(Position Sensing Device)

According to a second aspect of the present invention, a position sensing device for detecting a current position of a vehicle is provided.

A position sensing device according to a first embodiment of the present invention includes: a dead reckoning unit for determining a position of a vehicle by calculation based on dead reckoning at a predetermined cycle; a correction unit for executing correction processing for correcting a position determination result obtained through dead reckoning and a vehicle speed, a pitch angle, and a sensor mounting angle used in the position determination executed through dead reckoning in accordance with direction-specific positional components and speed components of the vehicle, which are measured with a GPS receiver in a measurement period of the GPS receiver which is longer than the predetermined cycle; and a GPS data determination unit for determining a reliability of each of the direction-specific positional components and speed components of the vehicle, which are measured with the GPS receiver, and calculating an error index of a component determined to be a reliable component, wherein the correction unit includes a unit for setting the degree of contribution of a measurement component determined to be an unreliable component to the correction processing to zero or almost zero, and reducing the degree of contribution of a measurement component determined to be a reliable component to the correction processing in accordance with a value of the error index.

A position sensing device according to a second embodiment of the present invention includes: a dead reckoning unit for determining a position of the vehicle by calculation based on dead reckoning at a predetermined cycle; a correction unit for executing correction processing for correcting a position determination result obtained through dead reckoning and a vehicle speed, a pitch angle, and a sensor mounting angle used in the position determination executed through dead reckoning in accordance with direction-specific positional components and speed components of the vehicle, which are measured with a GPS receiver in a measurement period of the GPS receiver which is longer than the predetermined cycle; and a GPS data determination unit for determining a reliability of each of the direction-specific positional components and speed components of the vehicle, which are measured with the GPS receiver, and calculating an error index of a component determined to be a reliable component, wherein the correction unit includes: a unit for executing control not to perform the correction processing if at least one of the measurement components is determined to be an unreliable component; and a unit for executing the correction processing and reducing the degree of contribution of each measurement component to the correction processing in accordance with a value of the error index if all measurement components are determined to be a reliable component.

A position sensing device according to a third embodiment of the present invention includes: a dead reckoning unit for determining a position of the vehicle by calculation based on dead reckoning at a predetermined cycle; a correction unit for executing correction processing for correcting a position determination result obtained through dead reckoning and a vehicle speed, a pitch angle, and a sensor mounting angle used in the position determination executed through dead reckoning in accordance with direction-specific positional components and speed components of the vehicle, which are measured with a GPS receiver in a measurement period of the GPS receiver which is longer than the predetermined cycle; and a GPS data determination unit for determining a reliability of each of the direction-specific positional components and speed components of the vehicle, which are measured with the GPS receiver, and calculating an error index of a component determined to be a reliable component, wherein the correction unit includes: a unit for, if GPS measurement components are divided into a speed component group and a positional component group, and at least one of the measurement components in a group is determined to be an unreliable component, executing control not to perform the correction processing by use of the measurement components in the group including the unreliable component; and a unit for, if all measurement components in a target group are determined to be a reliable component, executing the correction processing by use of the measurement components in the target group and reducing the degree of contribution of each measurement component to the correction processing in accordance with a value of the error index.

The position sensing device according to the first, second, or third embodiment of the present invention further includes a second correction unit for measuring a vehicle speed using an output signal of a moving distance detecting sensor in a period longer than the predetermined cycle for dead reckoning and not longer than the GPS measurement period, and correcting the vehicle speed, the pitch angle, and the sensor mounting angle used in dead reckoning in accordance with a difference between the measured vehicle speed and the vehicle speed determined through dead reckoning.

According to some embodiments of the present invention, a reliability of each component of GPS output data is determined, and the degree of contribution of a component determined to be an unreliable component to correction processing is set to zero or almost zero, so a positioning accuracy can be increased.

According to some embodiments of the present invention, a reliability of each component of GPS output data is determined, and an error index of a component determined to be a reliable component is calculated to reduce the degree of contribution to the correction processing in accordance with the error index to thereby increase a positioning accuracy.

According to some embodiments of the present invention, even if a GPS receiver not outputting an error index is used, it is possible to determine a reliability of GPS measurement data (positional data and speed data in three directions, vehicle's latitude, longitude, and height) as well as calculate an error index of a component determined to be a reliable component. Thus, correction processing can be executed with a Kalman filter without requiring an expensive GPS receiver.

According to some embodiments of the present invention, if at least one of GPS measurement components is determined to be an unreliable component, the correction processing is not performed. If all measurement components are determined to be a reliable component, the correction processing is performed, and the degree of contribution of each measurement component to the correction processing is reduced in accordance with an error index, so a positioning accuracy can be increased.

According to some embodiments of the present invention, GPS measurement components are divided into a speed component group and a position component group, and if at least one of the measurement components in a group is determined to be an unreliable component, the correction processing is not performed. If all measurement components are determined to be a reliable component, the correction processing is performed, and the degree of contribution of each measurement component to the correction processing is reduced in accordance with an error index. Hence, if a measurement accuracy varies among groups, correction processing is performed on a group basis to increase a positioning accuracy.

BRIEF DESCRIPTION OF THE DRAWINGS

FIG. 21 is a flowchart of a processing flow in which GPS measurement data is divided into a speed group and a position group, and if at least one of the GPS measurement data in each group is determined to be unreliable, correction processing is not performed with measurement data in a group including the unreliable data;

FIG. 26 shows a matrix example of a linear system F of a Kalman filter; and

FIG. 27 shows an example of an observation matrix H of a Kalman filter.

DESCRIPTION OF THE PREFERRED EMBODIMENTS (A) Summary of the Invention

Figure 1:
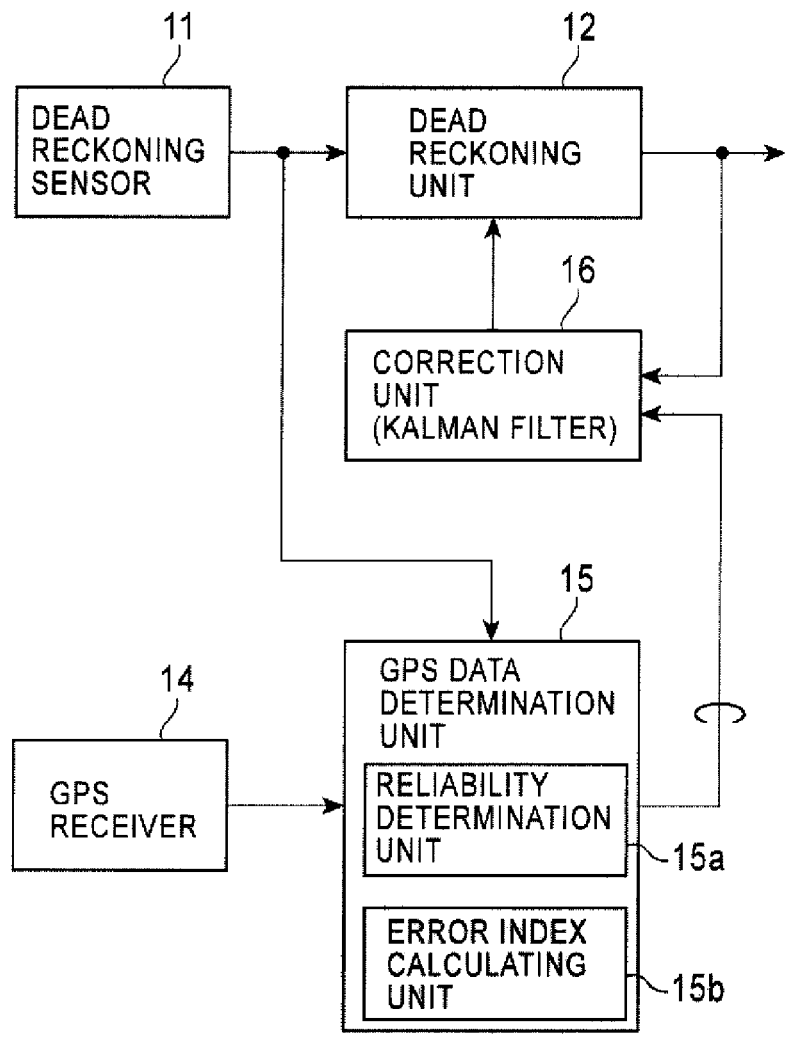
FIG. 1 is a schematic diagram of a position sensing device according to one embodiment of the present invention.

FIG. 1 is an explanatory view of a position sensing device according to the present invention. The device includes a dead reckoning sensor 11, a dead reckoning unit 12, a GPS receiver 14, a GPS data determination unit (GPS filter) 15, and a correction unit (Kalman filter processing unit) 16. The dead reckoning sensor 11 includes a moving distance detection unit (vehicle sensor) for measuring a moving distance of a vehicle, a relative direction sensor (gyro) for outputting a signal corresponding to an amount of change in vehicle direction, and an acceleration sensor for detecting an acceleration of a vehicle. The dead reckoning unit 12 calculates a vehicle position through dead reckoning at a predetermined cycle using an output signal of the dead reckoning sensor. The GPS receiver 14 calculates a three-dimensional position (latitude, longitude, and height) and three-dimensional speed (northward speed, eastward speed, and vertical speed) based on signals receives from a GPS satellite network in a GPS measurement period, at intervals of 1 sec for example, to output the calculation result. The GPS data determination unit 15 includes a reliability determination unit 15a and an error index calculating unit 15b. The reliability determination unit 15a determines a reliability of each of the direction-specific position component data and the speed component data measured with a GPS receiver. If any component data is determined to be unreliable, the error index calculating unit 15b sets an error index of the component data to a large value to negate a contribution of the component data to correction processing. If all component data are determined to be reliable, the error index calculating unit 15b calculates error indexes of the component data.

The Kalman filter processing unit 16 carries out correction processing for correcting a position calculation result obtained with the dead reckoning unit 12 using direction-specific position component data and speed component data measured with the GPS receiver 14, error indexes of each component data, and a vehicle speed, pitch angle, and sensor mounting angle used in position calculation with the dead reckoning unit.

In this case, the Kalman filter processing unit 16 sets the degree of contribution of a measurement component determined to be unreliable to the correction processing to zero or almost zero, and reduces the degree of contribution of a measurement component determined to be reliable to the correction processing in accordance with an error index.

Alternatively, the Kalman filter processing unit 16 performs control to cancel the correction processing if at least one of the GPS measurement components is determined to be unreliable, and performs the correction processing and reduces the degree of contribution of each GPS measurement component to the correction processing in accordance with an error index if all measurement components are determined to be reliable.

Alternatively, the Kalman filter processing unit 16 divides the GPS measurement components into a speed component group and a position component group. If at least one of the measurement components in a group is determined to be unreliable, the Kalman filter processing unit 16 cancels the correction processing with measurement components in the group including the unreliable component. However, if all measurement components in a target group are determined to be reliable, the Kalman filter processing unit 16 performs the correction processing using the measurement components of the target group and reduces the degree of contribution of each measurement component to the correction processing in accordance with an error index.

(B) Position Sensing Device

Figure 2:
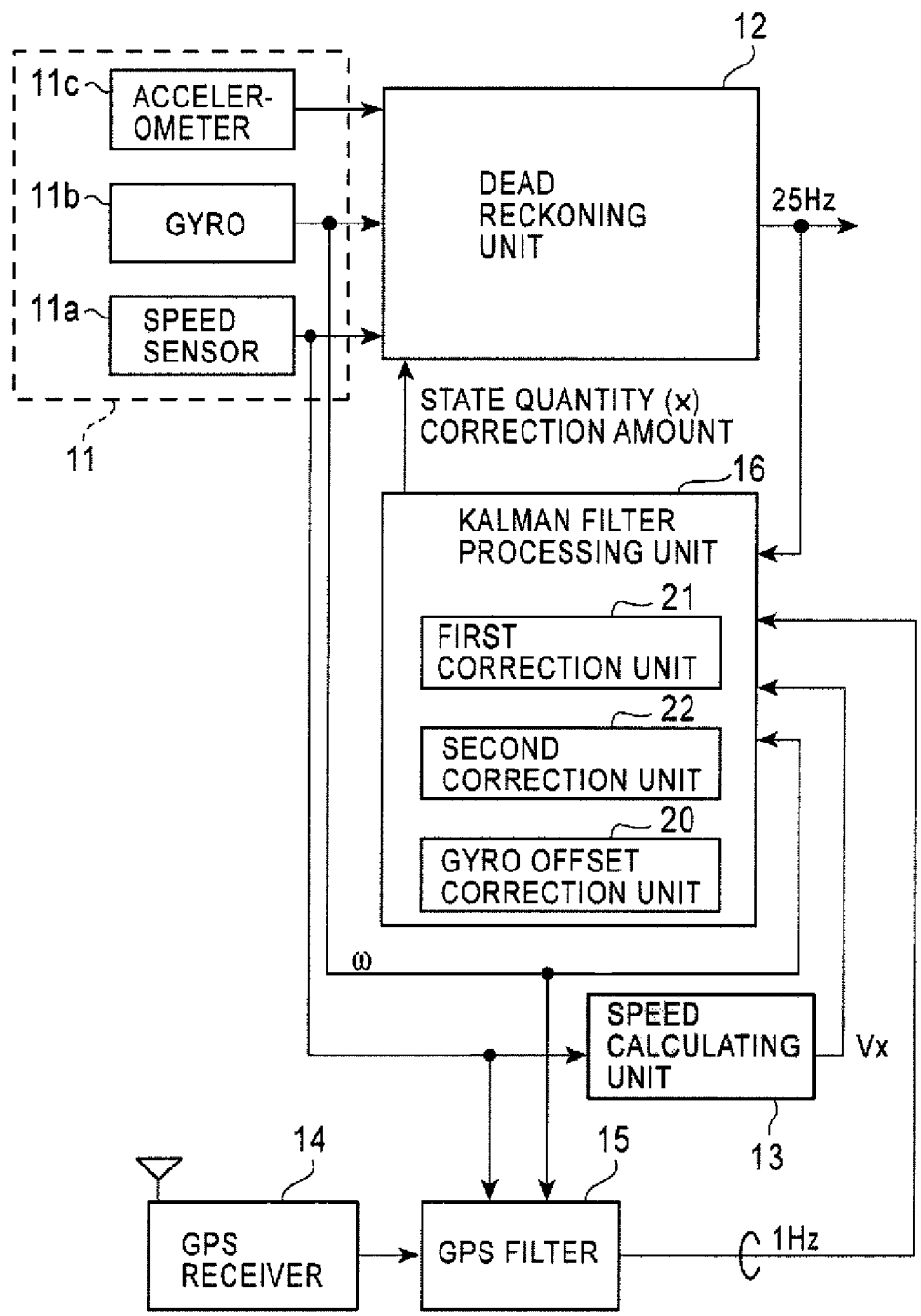
FIG. 2 is a block diagram of the position sensing device according to one embodiment of the present invention.
Figure 3A:
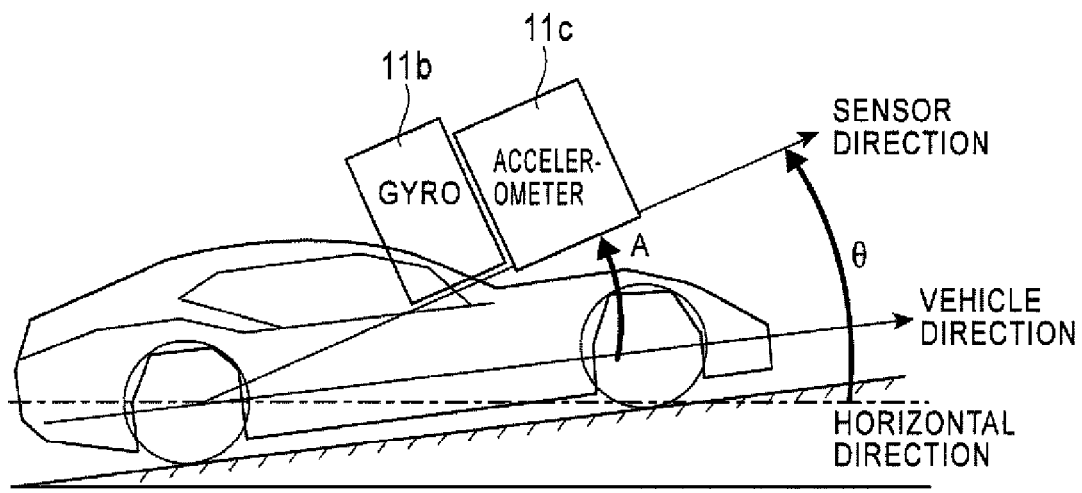
FIGS. 3A and 3B are explanatory views of posture parameters (pitch angle θ, sensor mounting pitch angle A, yaw angle Y, and sensor mounting yaw angle A2)
Figure 3B:
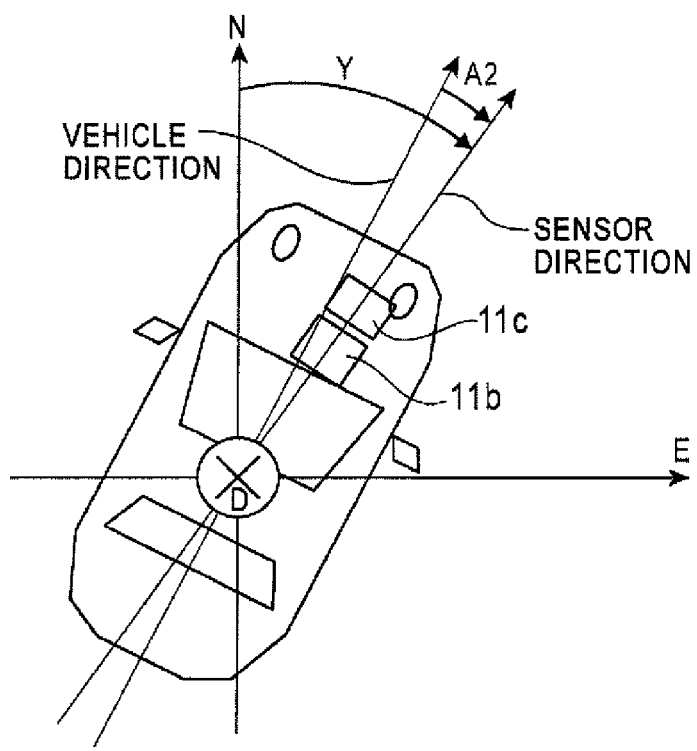

FIG. 2 is a detailed diagram of one position sensing device using the present invention. The position sensing device is provided with a moving distance detecting unit for measuring a moving distance of a vehicle, for example, a vehicle sensor 11a that generates one pulse each time the vehicle travels a predetermined distance, a gyro 11b as a relative direction sensor for outputting a signal corresponding to an amount of change in vehicle direction, and an acceleration sensor 11c for detecting an acceleration of a vehicle. The vehicle sensor 11a is attached to a wheel, and the gyro 11b and the acceleration sensor 11c are integrally mounted to a dashboard in a predetermined position. The gyro 11b and the acceleration sensor 11c are ideally attached to the vehicle in parallel with the vehicle direction as viewed from the side, but as shown in FIG. 3A, the sensors may be attached with an error, more specifically, at an angle A (mounting pitch angle) to the vehicle direction. The angle θ of the sensor to a horizontal direction is referred to as a pitch angle. The pitch angle is the sum of an inclined angle and the mounting pitch angle. Further, the gyro 11b and the acceleration sensor 11c are ideally attached to the vehicle in the same direction as the vehicle direction as viewed from above, but as shown in FIG. 3B, the sensors may be attached with an error, more specifically, at an angle A2 to the vehicle direction (mounting yaw angle). An angle Y between the northward direction and the sensor direction is a yaw angle, and the yaw angle Y is the sum of the angle of the vehicle direction and the mounting yaw angle.

Figure 4A:
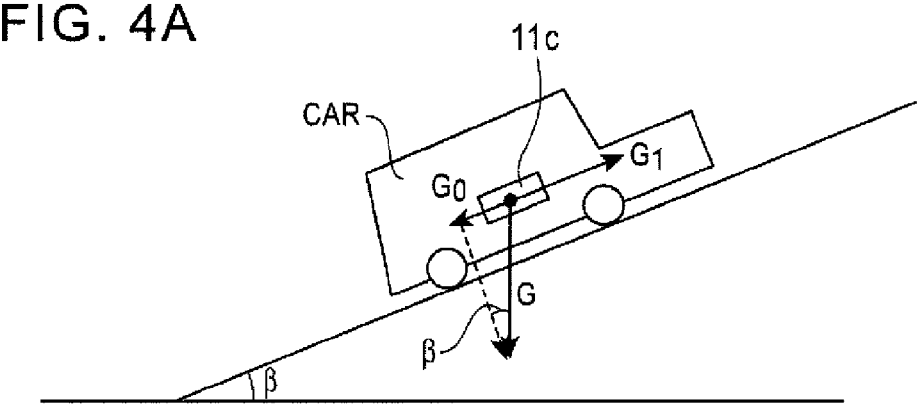
FIGS. 4A to 4C are explanatory views illustrating a method of calculating a vehicle speed Vsp(k) using an acceleration signal output from an acceleration sensor.

The dead reckoning unit 12 calculates a vehicle speed in a front-and-back direction and a three-dimensional position of a vehicle (latitude position N(k), longitude position E(k), and height D(k)) at a high rate, for example, at a frequency of 25 Hz based on output signals of the dead-reckoning sensors to output the calculation result. An acceleration of gravity G is vertically applied to a vehicle CAR. If the mounting pitch angle A is 0, as shown in FIG. 4A, a tilt direction component G0 is expressed as follows:

$$G0 = G \times \sin \beta$$

Accordingly, an acceleration Acc measured with the acceleration sensor 11c equals the sum of an acceleration G1 in a moving direction of a vehicle and a tilt direction component. The acceleration Ace is expressed as follows:

$$Acc = G \times \sin \beta \times G1$$

Figure 4B:
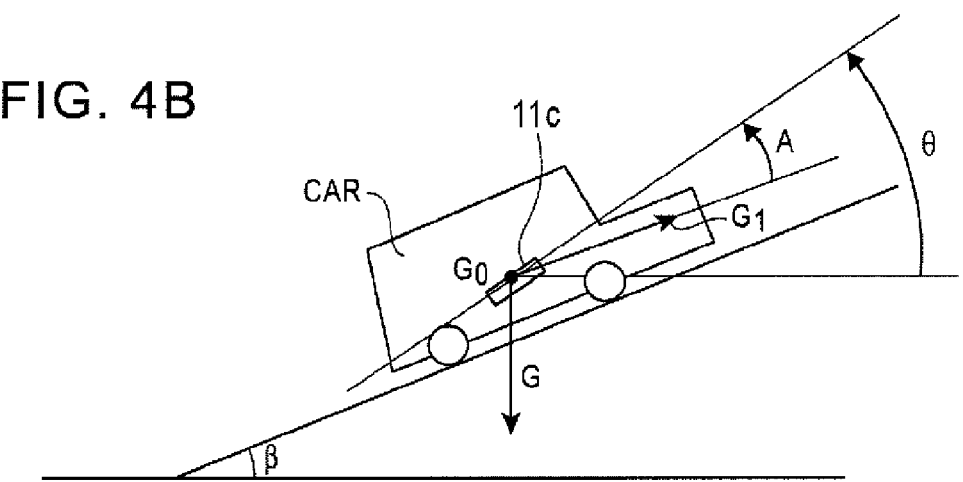
Figure 4C:
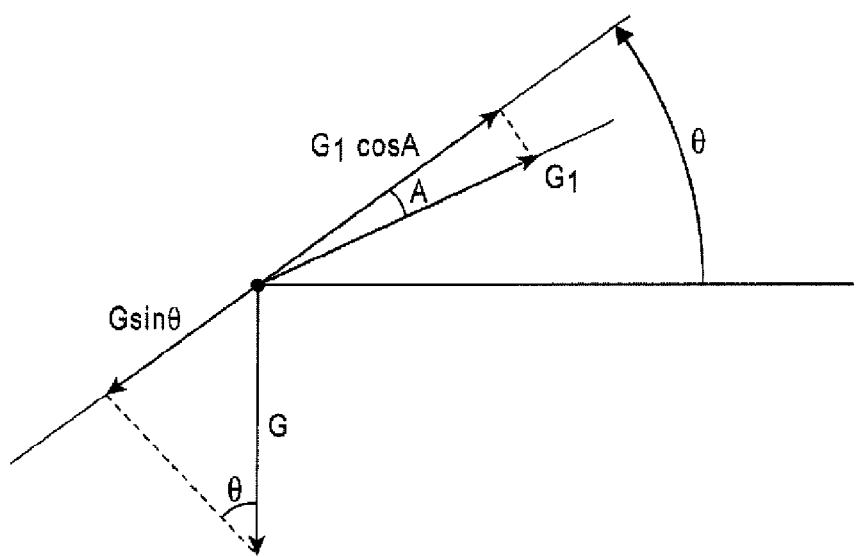

In the above expression, a value of G×sin is negative if a vehicle is traveling uphill or positive if a vehicle is traveling downhill. If the mounting pitch angle A is not 0, as shown in FIG. 4B, the acceleration sensor 11c measures the acceleration Ace in the pitch angle θ (=β+A) direction. Thus, as shown in FIG. 4C, the gravity acceleration component in the pitch angle direction is G×sin θ. The acceleration component in the pitch angle direction applied along with movement of the vehicle is G1×cos A. The following expression is established:

$$Acc = G \times \sin \theta + G1 \times \cos A$$

Regarding the mounting yaw angle A2, the following expression is established:

$$Acc = G \times \sin \theta + G1 \times \cos A \times \cos A2$$

Thus, the acceleration G1 in the tilt direction is expressed as follows:

$$G1 = (Acc - G \times \sin \theta)/(\cos A \times \cos A2) \quad (1)$$

Provided that T1 represents an acceleration measurement period, a change rate ΔV is derived from the following expression:

$$\Delta V = T1 \times (Acc - G \times \sin \theta)/(\cos A \times \cos A2)$$

Thus, a speed Vsp(k+1) is derived from the following expression based on a speed Vsp(k) measured at a previous discrete time k:

$$Vsp(k+1) = Vsp(k) + T1 \times (Acc - G \times \sin \theta)/(\cos A \times \cos A2) \quad (2)$$

If an offset of the acceleration Acc is $\alpha_{OF}$, a value obtained by subtracting $\alpha_{OF}$ from the output signal Acc of the acceleration sensor is set as Acc and substituted into Expression (2). That is, $$Acc = Acc - \alpha_{OF}$$

Further, the dead reckoning unit 12 calculates a three-dimensional position of a vehicle (latitude position N(k), longitude position E(k), and height D(k)) based on the following expressions and outputs the calculation result:

$$N(k+1) = N(k) + S(\cos \theta \cos Y \cos A \cos A2 + \sin Y \sin A2 + \sin \theta \cos Y \sin A \cos A2)$$

$$E(k+1) = E(k) + S(\cos \theta \sin Y \cos A \cos A2 - \cos Y \sin A2 + \sin \theta \sin Y \sin A \cos A2)$$

$$D(k+1) = D(k) + S(-\sin \theta \cos A \cos A2 + \cos \theta \sin A \cos A2) \quad (3)$$

where S=(the number of speed pulses per sample time T1×pulse interval)
=distance a vehicle travels in a vehicle direction per sample time
In the expression, S is projected to an N-E-D coordinate system (North-East-Down coordinate system) using four angles (θ, A, Y, A2).

The speed calculating unit 13 calculates a vehicle speed using a moving distance L per pulse and the number of pulses N output from the speed sensor 11a and in a predetermined period T2 (for example, a frequency of 10 Hz) based on the following expression $$Vx = N \times L/T2 \quad (4)$$

The GPS receiver 14 calculates a three-dimensional position (latitude, longitude, and height) and speed (northward speed, eastward speed, and vertical speed) based on a signal received through a GPS satellite network in a GPS measurement period, that is, at intervals of 1 second to output the calculation result.

Figure 5:
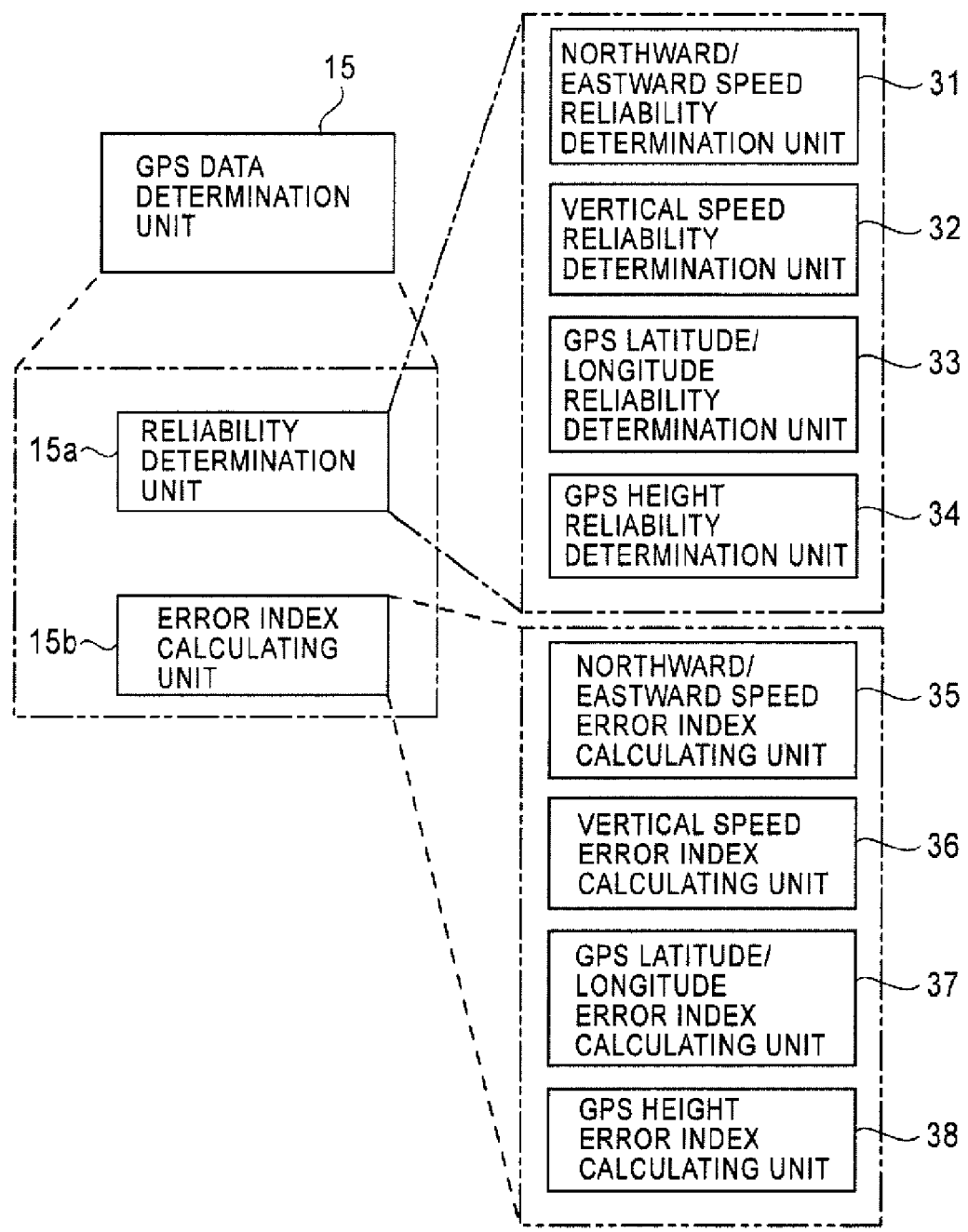
FIG. 5 is a diagram of a GPS filter.

As shown in FIG. 5, the GPS data determination unit 15 includes the reliability determination unit 15a and the error index calculating unit 15b. The reliability determination unit 15a determines a reliability of each of the direction-specific position component data of a vehicle (latitude, longitude, and height) and the speed component data (northward speed, eastward speed, and vertical speed) measured with the GPS receiver. If any component data is determined to be unreliable, the error index calculating unit 15b sets an error index of the data to a large value (for example, 1000) to negate the contribution of the data to correction processing. If component data is determined to be reliable, the GPS receiver 14b calculates an error index of the component data. The reliability determination unit 15a includes a northward/eastward speed reliability determination unit 31, a vertical speed reliability determination unit 32, a GPS latitude/longitude reliability determination unit 33, and a GPS height reliability determination unit 34. The error index calculating unit 15b includes a northward/eastward speed error index calculating unit 35, a vertical speed error index calculating unit 36, a GPS latitude/longitude error index calculating unit 37, and a GPS height error index calculating unit 38. Error indexes of position component data are represented by δPx, δPy, and δPz. Error indexes of speed component data are represented by δVx, δVy, and δVz.

The GPS data determination unit 15 supplies direction-specific position component data of a vehicle (latitude, longitude, and height) and speed component data (northward speed, eastward speed, and vertical speed) measured with the GPS receiver, and error indexes of each component data to the Kalman filter processing unit 16.

The reliability determination processing and error index calculation processing of the reliability determination unit 15a and the error index calculating unit 15b are described below with reference to FIGS. 6 to 17.

The Kalman filter processing unit 16 includes a gyro offset correction unit 20, a first correction unit 21, and a second correction unit 22. However, the Kalman filter processing unit 16 may be not provided with the first correction unit 21.

Based on the fact that, if the speed Vx is zero (in other words, the vehicle is stopped), an angular speed signal is "offset+noise", the gyro offset correction unit 20 calculates a difference between the angular speed signal output $\omega_{OF}$ and an angular speed signal offset calculated with the dead reckoning unit 12 to correct the angular speed signal offset $\omega_{OF}$ through a Kalman filter process as described below in a short period.

The dead reckoning unit 12 calculates a direction change Δω(k) using an angular speed signal ω measured with an output signal of the dead reckoning sensor 11b based on the following expression:

$$\Delta \omega(k) = (\omega - \omega_{OF}) \times T1$$

In addition, the dead reckoning unit 12 calculates the pitch angle θ and the yaw angle Y based on the following expres sion derived with known inertial navigation system techniques to update these values:

$$C_{00} = \cos\theta(k+1) \times \cos Y(k+1) - \sin Y(k) \times \Delta\omega(k)$$

$$C_{10} = \cos\theta(k+1) \times \sin Y(k+1) = \cos Y(k) \times \Delta\omega(k) \quad (5)$$

The dead reckoning unit 12 calculates the sensor mounting pitch angle A, the sensor mounting yaw angle A2, the angular speed signal offset $\omega_{OF}$, and the acceleration signal offset $\alpha_{OF}$ based on the following expressions:

$$A(k+1) = A(k)$$

$$A2(k+1) = A2(k)$$

$$\omega_{OF}(k+1) = \omega_{OF}(k)$$

$$\alpha_{OF}(k+1) = \alpha_{OF}(k) \quad (6)$$

These values are not changed until corrected.

The first correction unit 21 of the Kalman filter processing unit 16 executes a first Kalman filter process in a first period (for example, a frequency of 10 Hz). In the first Kalman filter process, the first correction unit 21 corrects the vehicle speed Vsp, the pitch angle θ, the sensor mounting pitch angle A, the sensor mounting yaw angle A2, the angular speed signal offset $\omega_{OF}$, and the acceleration signal offset $\alpha_{OF}$, which are calculated by the dead reckoning unit.

The second correction unit 22 of the Kalman filter processing unit 16 corrects the vehicle position (vehicle's latitude, longitude, and height), the vehicle speed, the pitch angle θ, the sensor mounting pitch angle A, the yaw angle A, the sensor mounting yaw angle A2, the angular speed signal offset $\omega_{OF}$, and the acceleration signal offset $\alpha_{OF}$ (all parameters calculated by dead reckoning), which are calculated by the dead reckoning unit based on direction-specific position component data of the vehicle (latitude, longitude, and height), speed component data (northward speed, eastward speed, and vertical speed), and error indexes of each component data, which are output from the GPS receiver 14, and three-dimensional vehicle position and speed output from the dead reckoning unit 12, in a second period longer than the first period (for example, a frequency of 1 Hz). The second correction unit 22 sets the degree of contribution of measurement component data determined to be unreliable to the correction processing to zero or almost zero, and reduces the degree of contribution of measurement component data determined to be reliable to the correction processing in accordance with an error index.

The Kalman filter process of the first correction unit 21 and the second correction unit 22 is described in detail below.

The dead reckoning unit 12 calculates a vehicle speed or position using the pitch angle θ, the sensor mounting pitch angle A, and the sensor mounting yaw angle A2, which are updated with the first correction unit 21 at a frequency of 10 Hz based on Expressions (2) and (3), and calculates a vehicle speed or position using the pitch angle θ, the sensor mounting pitch angle A, the yaw angle Y, and the sensor mounting yaw angle A2, which are updated with the second correction unit 22 at a frequency of 1 Hz based on Expressions (2) and (3) to output the calculation result.

(C) Reliability Determination and Error Index Calculation

FIGS. 6 to 17 are flowcharts of a reliability determination and error index calculation processing flow.

Figure 6:
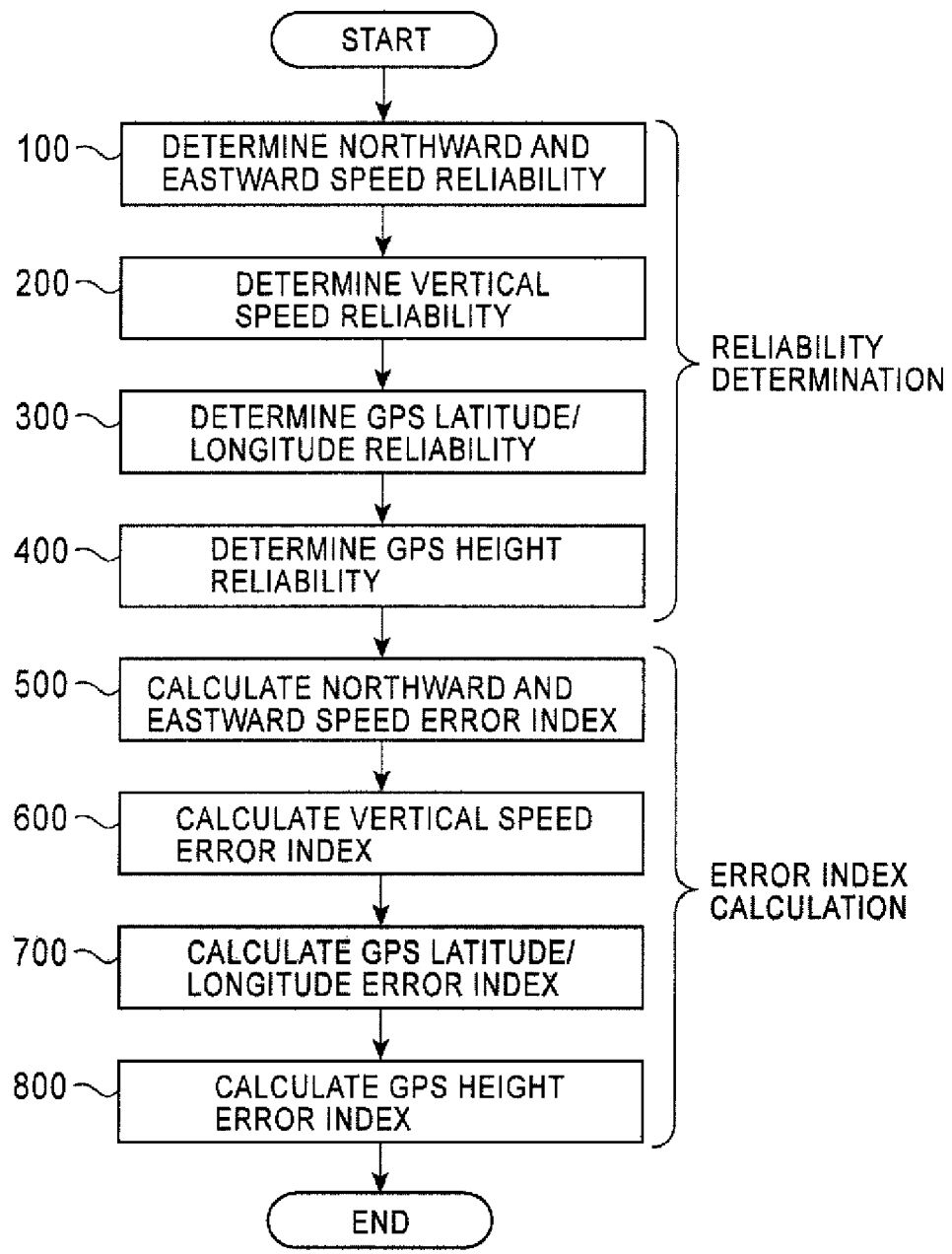
FIG. 6 is a flowchart of a GPS filter reliability measurement and error index calculation processing flow.

The GPS data determination unit 15 may determine the reliability measurement and error index calculation in the order illustrated in FIG. 6. That is, the reliability determination unit 15a determines a northward/eastward speed reliability (step 100), determines a vertical speed reliability (step 200), determines a GPS latitude/longitude reliability (step 300), and determines a GPS height reliability (step 400). The error index calculating unit 15b calculates northward/eastward speed error indexes δVx and δVy (step 500), calculates a vertical speed error index δVz (step 600), calculates GPS latitude/longitude error indexes δPx and δPy (step 700), and calculates a GPS height error index δPz (step 800).

(a) Reliability Determination Processing

1) Northward/Eastward Speed Reliability Determination Processing

Figure 7:
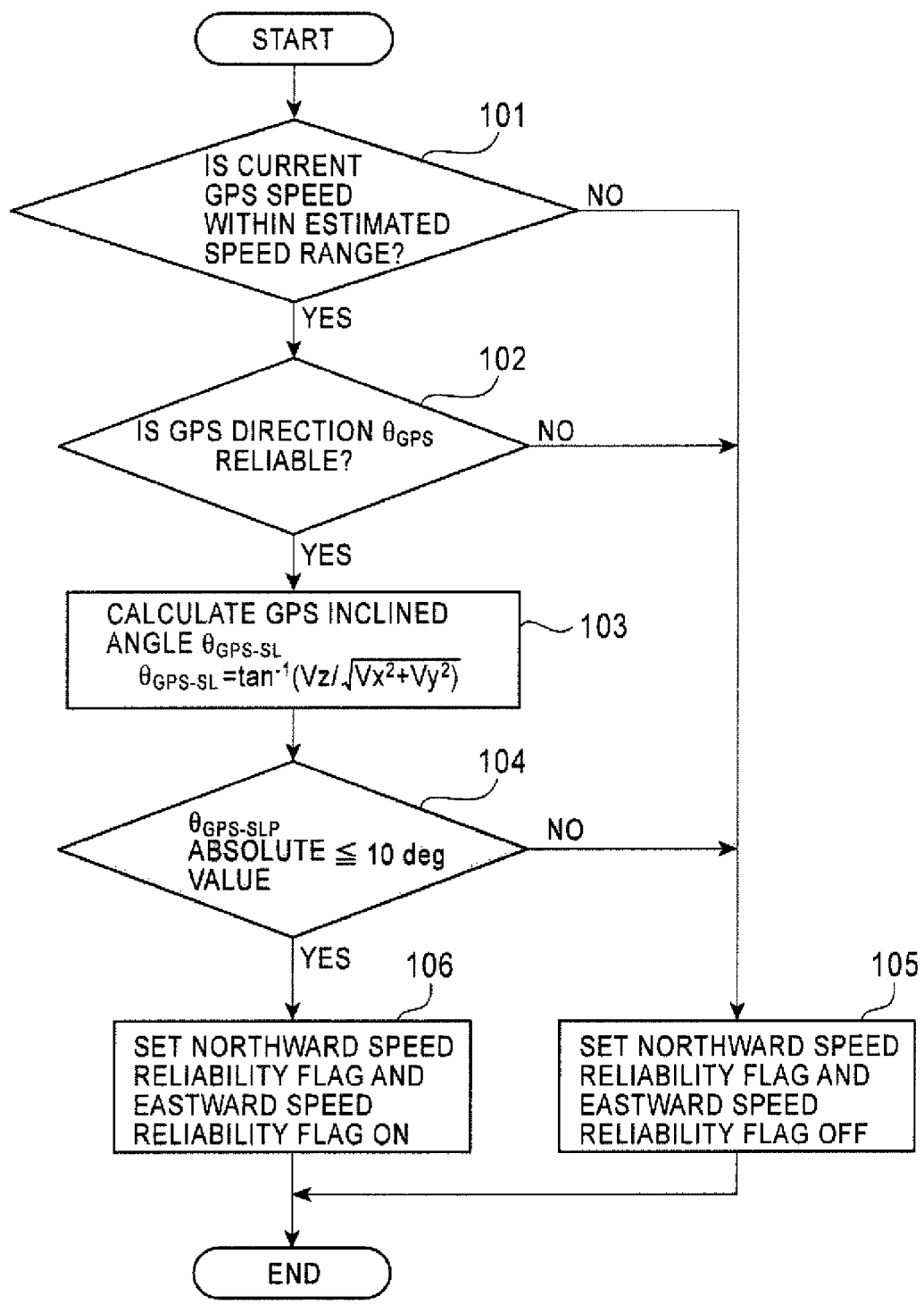
FIG. 7 is a flowchart of a northward/eastward speed reliability determination processing flow.
Figure 8:
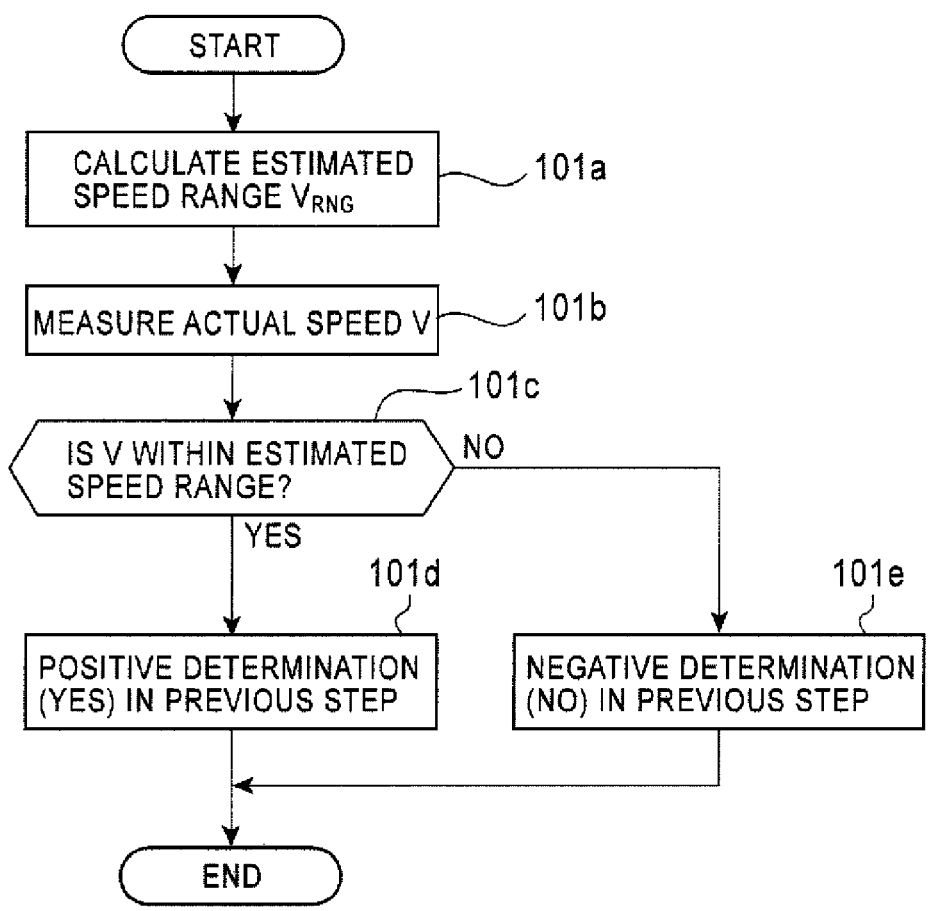
FIG. 8 is a flowchart of a determination processing flow for determining whether a GPS speed falls within an estimated speed range.
Figure 9:
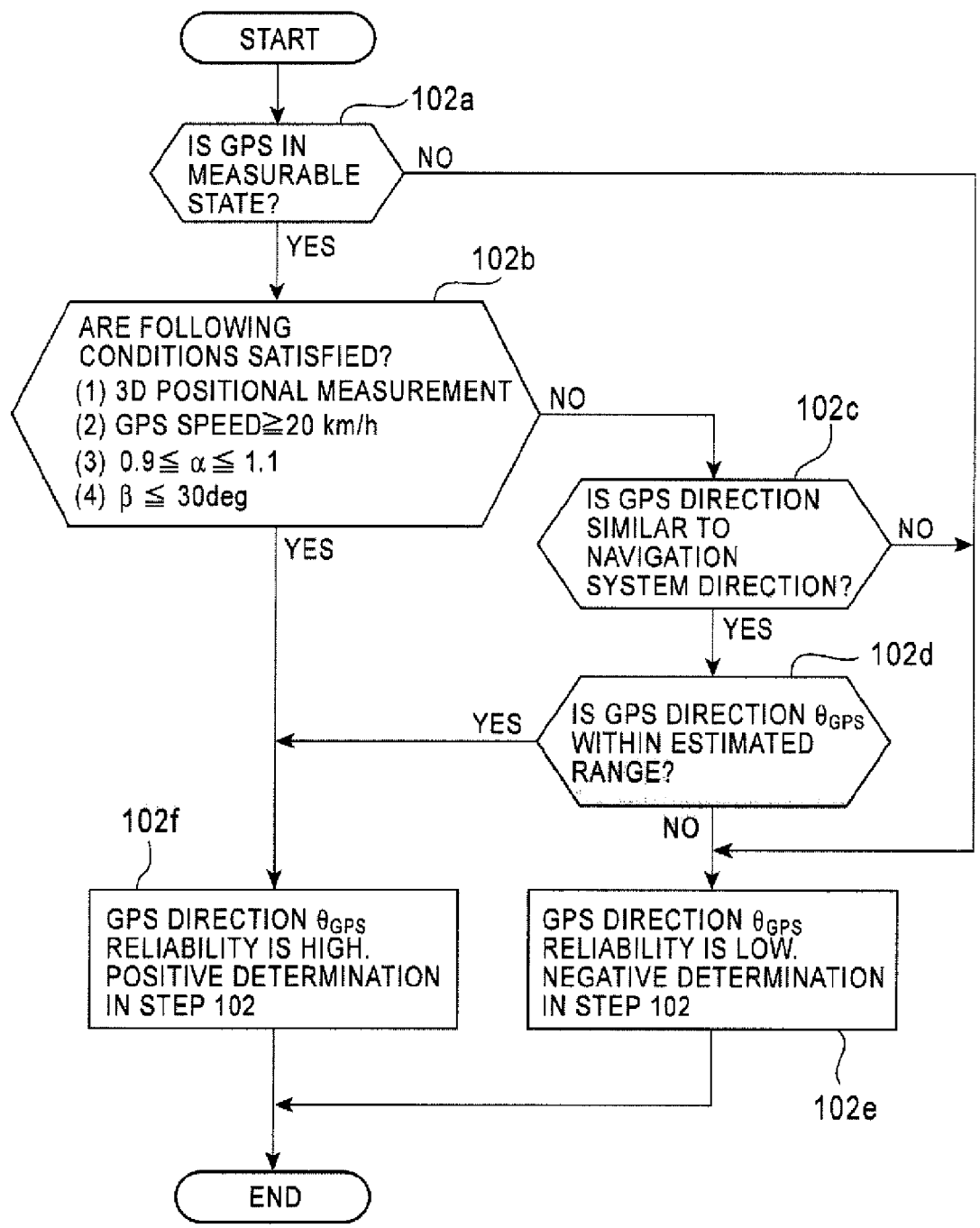
FIG. 9 is a flowchart of a determination processing flow for determining a reliability of a GPS direction $\theta_{GPS}$.

FIGS. 7 to 9 are flowcharts of a northward/eastward speed reliability determination processing flow.

The northward/eastward speed reliability determination unit 31 of the reliability determination unit 15a (FIG. 5) checks whether a current GPS speed falls within a predicted speed range (step 101). For example, as shown in FIG. 8, a predicted speed range $V_{RNG}$ is determined based on a previous speed and an estimated maximum acceleration (step 101a). Then, a current actual speed V is measured (step 101b) to compare the actual speed V with the estimated speed range $V_{RNG}$ (step 101c). If $V < V_{RNG}$, the northward/eastward speed reliability determination unit 31 makes a positive determination "YES" in step 101 (step 101d). If $V \geq V_{RNG}$, the northward/eastward speed reliability determination unit 31 makes a negative determination "NO" in step 101 (step 301e).

Subsequently, the northward/eastward speed reliability determination unit 31 determines a reliability of the GPS direction $\theta_{GPS}$ obtained with GPS measurement data (step 102). FIG. 9 is a flowchart of a GPS direction $\theta_{GPS}$ reliability determination processing flow. First, the northward/eastward speed reliability determination unit 31 checks whether the UPS is in a measurable state (step 102a). If the GPS is not in a measurable state, the GPS direction $\theta_{GPS}$ is not reliable, and in step 102, the northward/eastward speed reliability determination unit 31 makes a negative determination "NO" (step 102e). If the GPS is in a measurable state, the northward/eastward speed reliability determination unit 31 determines whether the following measurement conditions (1) to (4) are satisfied (step 102b).

(1) The GPS measurement data is three-dimensional measurement data. This is because the three-dimensional measurement data is more accurate than two-dimensional measurement data.

(2) The UPS measurement speed is not lower than a threshold value (for example, 20 Km/h). This is because a measurement accuracy of the UPS direction is lower at a lower speed.

(3) A driving distance ratio α is within a predetermined range (for example, $0.9 \leq$ driving distance ratio $\leq 1.1$). The driving distance ratio is a ratio between a driving distance derived from a GPS measurement position and a driving distance derived from the number of vehicle speed pulses. More accurate GPS measurement data is obtained with the ratio closer to 1.

(4) The advancing angle error β is not larger than a threshold value (for example, advancing angle error $\leq 30$ degrees). The advancing angle error is a difference between an angle between two GPS measurement positions and the GPS direction. More accurate UPS measurement data is obtained with the advancing angle error closer to 0.

If the above measurement conditions (1) to (4) are all satisfied, the GPS direction $\theta_{GPS}$ is determined to be reliable, and the northward/eastward speed reliability determination unit 31 makes a positive determination "YES" in step 102 (step 102f).

If any one of the measurement conditions is not satisfied in step 102b, the northward/eastward speed reliability determination unit 31 determines the similarity between the GPS direction $\theta_{GPS}$ and the dead-reckoning direction $\theta_{gyro}$ obtained with dead-reckoning (step 102c). That is, the northward/eastward speed reliability determination unit 31 determines the similarity between the GPS direction $\theta_{GPS}$ and the dead-reckoning direction $\theta_{gyro}$ based on the following expression:

$$\Delta\theta = |(\theta_{GPS1} - \theta_{GPS2}) - \theta_{gyro}| \leq 10 \text{(degree)} \quad (7)$$

In the above expression, $\theta_{GPS1}$ represents a current GPS direction, $\theta_{GPS2}$ represents a previous GPS direction, and $\theta_{gyro}$ represents a current dead-reckoning direction. If $\Delta\theta$ is larger than 10 degrees, there is no similarity therebetween, and the northward/eastward speed reliability determination unit 31 determines the GPS direction to be unreliable (step 102e).

If $\Delta\theta$ is smaller than 10 degrees, the northward/eastward speed reliability determination unit 31 checks whether the current GPS direction $\theta_{GPS1}$ is within an estimated range (step 102d). If the direction is not within the estimated range, the GPS direction is determined to be unreliable (step 102e). If the direction is within the estimated range, the GPS direction $\theta_{GPS}$ is determined to be reliable (step 102f). The estimated range varies depending on the linearity of a vehicle, so the northward/eastward speed reliability determination unit 31 determines whether the vehicle is traveling straight. If the vehicle is traveling straight, the estimated range is set based on the following expression:

$$\Delta\theta' = |(\theta_{GPS1} - (\theta_{t-1} + \theta_{gyro})| \leq 10 \text{(degree)} \quad (8)$$

Then, the northward/eastward speed reliability determination unit 31 determines whether the GPS direction $\theta_{GPS1}$ is within an estimated range. In the above expression, $\theta_{t-1}$ represents a previous advancing angle. If the vehicle is not traveling straight, the estimated range is set based on $\Delta\theta' \leq 14$ (degree) to determine whether the GPS direction $\theta_{GPS}$ falls within the estimated range.

In step 102, if the northward/eastward speed reliability determination unit 31 determines the GPS direction $\theta_{GPS}$ to be reliable, the GPS inclined angle $\theta_{GPS-SL}$ is calculated based on the following expression (step 103):

$$\theta_{GPS-SL} = \tan^{-1}(VD_{GPS}/\sqrt{VN_{GPS}^2 + VE_{GPS}^2}) \quad (9)$$

In the above expression, $VN_{GPS}$ represents a northward speed, $VE_{GPS}$ represents an eastward speed, and $VD_{GPS}$ represents a vertical speed. Next, the northward/eastward speed reliability determination unit 31 determines whether an absolute value of the GPS inclined angle $\theta_{GPS-SL}$ is 10 (degree) or less (step 104). This is where, e.g., roadway regulations prohibit road construction with an inclined angle of 10 (degree) or more. If the absolute value of the GPS inclined angle $\theta_{GPS-SL}$ is larger than 10 (degree), a northward speed reliability flag and an eastward speed reliability flag are both set to OFF (unreliable) (step 105). If the absolute value of the GPS inclined angle $\theta_{GPS-SL}$ is smaller than 10 (degree), the northward speed reliability flag and the eastward speed reliability flag are both set to ON (reliable) (step 106).

2) Vertical Speed Reliability Determination Processing

Figure 10:
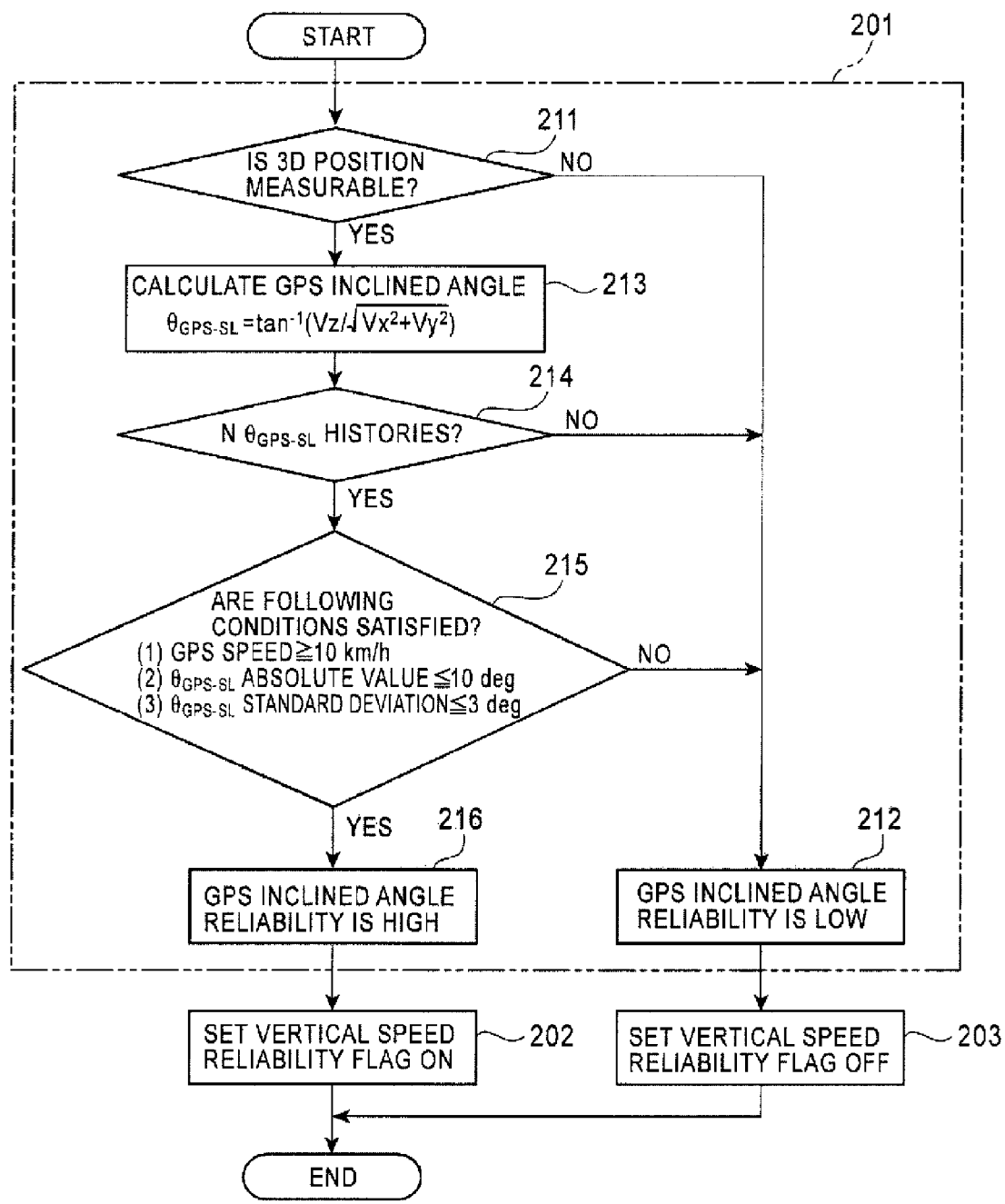
FIG. 10 is a flowchart of a vertical direction reliability determination processing flow.

FIG. 10 is a flowchart of a vertical speed reliability determination processing flow.

The vertical speed reliability determination unit 32 of the reliability determination unit 15a (FIG. 5) checks whether the reliability of a GPS inclined angle is high (step 201). If the reliability of the GPS inclined angle is high, the vertical speed reliability determination unit 32 judges the vertical speed highly reliable and sets a vertical speed reliability flag to ON (step 202). If the reliability of the GPS inclined angle is low, the vertical speed reliability determination unit 32 judges the vertical speed reliability to be low, and sets the vertical speed reliability flag to OFF (step 203).

In step 201, the vertical speed reliability determination unit 32 determines whether the GPS receiver is in a measurable state (step 211). If the GPS receiver is not in a measurable state, the vertical speed reliability determination unit 32 judges the GPS inclined angle reliability to be low (step 212) and sets the vertical speed reliability flag to OFF (step 203).

In the three-dimensional measurement state, the vertical speed reliability determination unit 32 calculates the GPS inclined angle $\theta_{GPS-SL}$ based on Expression (9) (step 213). Next, the vertical speed reliability determination unit 32 determines whether the number of histories of the calculated GPS inclined angle $\theta_{GPS-SL}$ is N (for example, N=5) (step 214). This is to determine whether a requisite number of samples for calculating a standard deviation of the GPS inclined angle $\theta_{GPS-SL}$ are obtained. Assuming that N histories of the UPS inclined angle $\theta_{GPS}$ are obtained, then it is determined whether the following three conditions are all satisfied (step 215):

(1) The GPS speed is 10 km/h or higher.
(2) An absolute value of the calculated GPS inclined angle $\theta_{GPS-SL}$ is 10 degrees or less.
(3) A standard deviation of the calculated GPS inclined angle $\theta_{GPS-SL}$ is 3 degrees or less.

If the three conditions are all satisfied, the vertical speed reliability determination unit 32 judges the GPS inclined angle $\theta_{GPS-SL}$ to be reliable (step 216) and sets the vertical speed reliability flag to ON (step 202). On the other hand, if at least one of the three conditions is not satisfied, the vertical speed reliability determination unit 32 judges the GPS inclined angle $\theta_{GPS-SL}$ to be unreliable (step 212) and sets the vertical speed reliability flag to OFF (step 203).

3) GPS Latitude/Longitude Reliability Determination Processing

Figure 11:
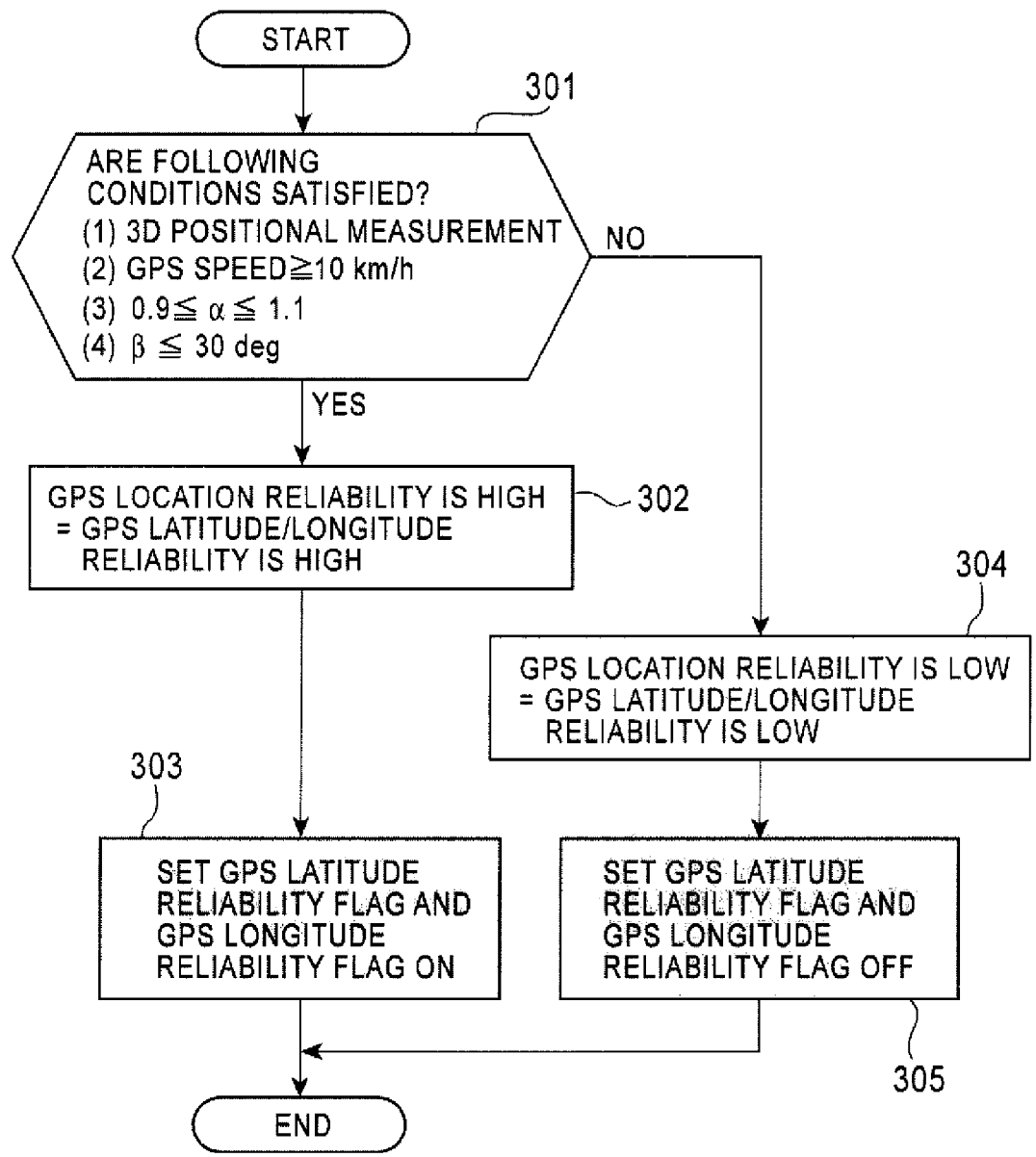
FIG. 11 is a flowchart of a UPS latitude/longitude reliability determination processing flow.

FIG. 11 is a flowchart of a GPS latitude/longitude reliability determination processing flow.

The GPS latitude/longitude reliability determination unit 33 of the reliability determination unit 15a (FIG. 5) determines whether the following measurement conditions (1) to (4) are satisfied (step 301):

(1) The GPS measurement data is three-dimensional measurement data.
(2) The GPS measurement speed is not lower than a threshold value (for example, 10 Km/h).
(3) A driving distance ratio α is within a predetermined range (for example, 0.9≦driving distance ratio≦1.1).
(4) The advancing angle error β is not larger than a threshold value (for example, advancing angle error≦30 degrees).

If the above measurement conditions (1) to (4) are all satisfied, the GPS latitude/longitude reliability determination unit 33 judges the GPS latitude/longitude reliability to be high (step 302) and sets a GPS latitude reliability flag and a GPS longitude reliability flag to ON (step 303). On the other hand, if at least one of the above measurement conditions is not satisfied, the GPS latitude/longitude reliability determination unit 33 judges the GPS latitude/longitude reliability to be low (step 304) and sets the GPS latitude reliability flag and the GPS longitude reliability flag to OFF (step 305).

4) GPS Height Reliability Determination Processing

Figure 12:
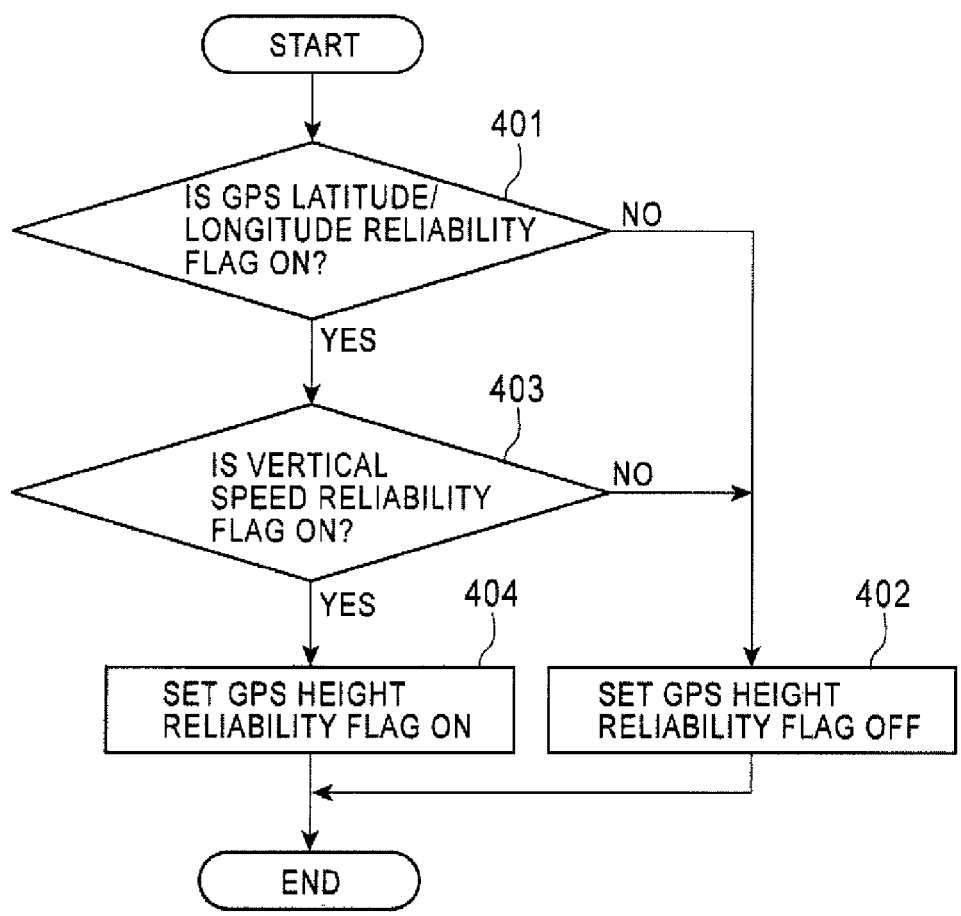
FIG. 12 is a flowchart of a GPS height reliability determination processing flow.

FIG. 12 is a flowchart of a GPS height reliability determination processing flow.

The GPS height reliability determination unit 34 of the reliability determination unit 15a (FIG. 5) determines whether the GPS latitude/longitude reliability flag is set to ON (step 401). If the GPS latitude/longitude reliability flag is set to OFF, the GPS height reliability determination unit 34 sets a GPS height reliability flag to OFF (step 402). On the other hand, in step 401, if the GPS latitude/longitude reliability flag is set to ON, it is determined whether a vertical speed reliability flag is set to ON (step 403). If the vertical speed reliability flag is set to OFF, the GPS height reliability flag is set to OFF (step 402). However, in step 403, if the vertical speed reliability flag is set to ON, the GPS height reliability flag is set to ON (step 404). That is, if the GPS latitude/longitude reliability flag and the vertical speed reliability flag are both set to ON, the GPS height reliability determination unit 34 judges the GPS height reliability to be high and sets the GPS height reliability flag to ON and sets the other flags to OFF.

(b) Error Index Calculation Processing

An error index (standard deviation σ) is calculated using an approximation that is set by associating numerous stored reference error data and parameters of data output from the GPS receiver. The approximation is obtained as follows. That is, parameters (error factors) related to an error are first selected. Then, an approximation representing an error index (standard deviation σ) of stored error data using each error factor. Finally, a weight to the approximation is determined based on a quality engineering technique. Then, weighting addition is performed to find the square root thereof.

1) Northward/Eastward Speed Error Index Calculation Processing

Figure 13:
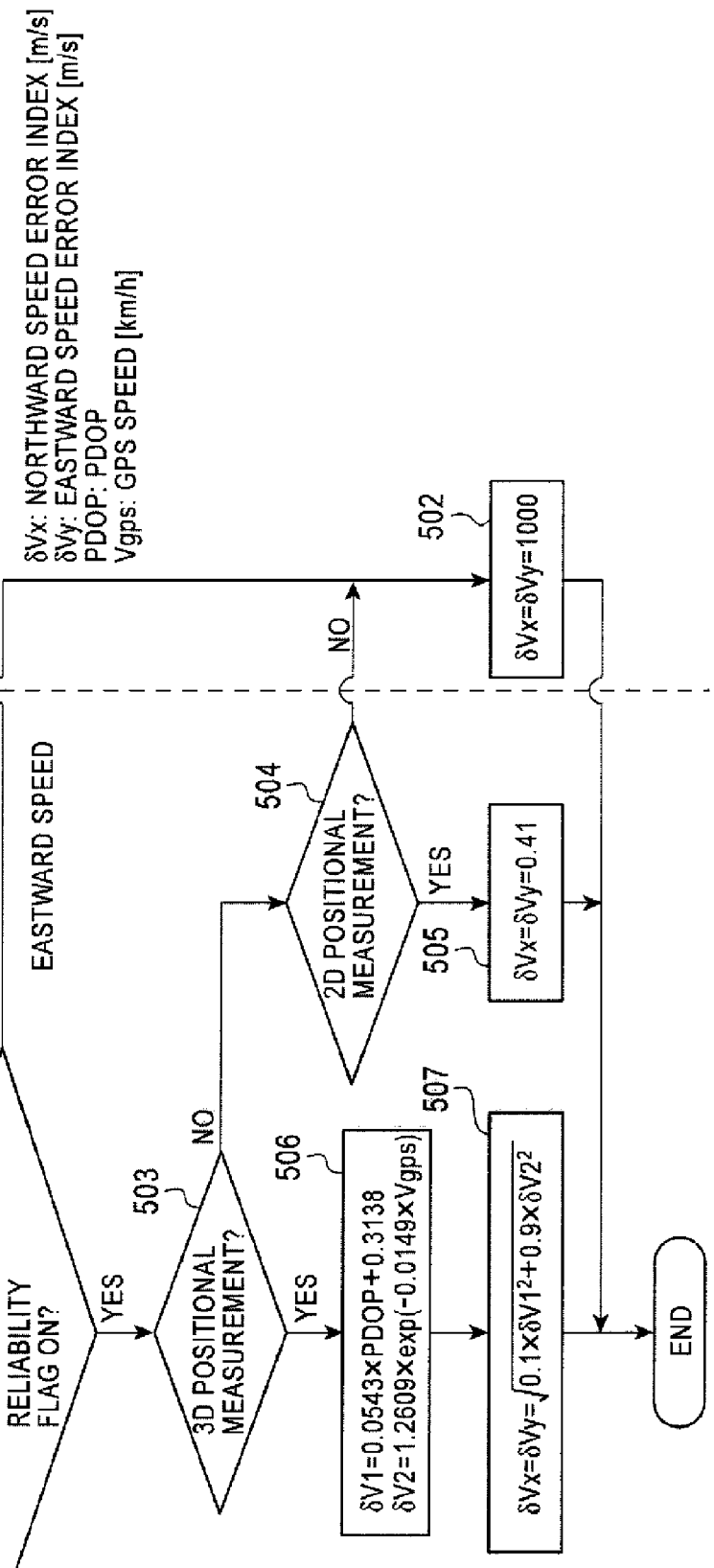
FIG. 13 is a northward/eastward speed error index calculation processing flow.

FIG. 13 is a flowchart of a northward/eastward speed error index calculation processing flow.

The northward/eastward speed error index calculating unit 35 of the error index calculating unit 15b (FIG. 5) determines whether the northward/eastward speed reliability flag is set to OFF (step 501). If the flag is set to OFF, the accuracy is low, so the northward speed error index δVx and the eastward speed error index δVy are set to 1000 m/s (step 502).

In step 501, if the northward/eastward speed reliability flag is set to ON, the northward/eastward speed error index calculating unit 35 checks whether the GPS measurement state is a three-dimensional measurement state (step 503). If the GPS measurement state is not a three-dimensional measurement state, the unit checks whether the GPS measurement state is a two-dimensional measurement state (step 504). If the GPS measurement state is not a two-dimensional measurement state, the unit sets both of the northward speed error index δVx and the eastward speed error index δVy to 1000 m/s (step 502). If the GPS measurement state is a two-dimensional measurement state, factors related to an error are not found, so the northward speed error index δVx and the eastward speed error index δVy are set to 0.41 m/s (step 505). This is a statistical result.

On the other hand, in step 503, if the GPS measurement state is a three-dimensional measurement state, the northward/eastward speed error index calculating unit 35 calculates an error index based on the approximation. Expressions (10) and (11), in accordance with a GPS speed (Vgps) and error factor PDOP related to a horizontal speed error (step 506). The PDOP (position dilution of precision) is a satellite position index in horizontal and vertical directions. The smaller the PDOP, the greater the accuracy. The PDOP-dependent northward/eastward speed error index δV1 is calculated based on the following expression:

$$\text{Northward/eastward speed error index } \delta V1 = 0.0543 \times PDOP + 0.3138 \quad (10)$$

The higher the GPS speed (Vgps), the greater the accuracy. The GPS speed (Vgps)-dependent northward/eastward speed error index δV2 is calculated based on the following expression:

$$\text{Northward/eastward speed error index } \delta V2 = 1.2609 \times \exp(-0.0149 \times Vgps) \quad (11)$$

Next, the northward/eastward speed error index calculating unit 35 adds weights of δV1 and δV2 to calculate the northward speed error index δVx and the eastward speed error index δVy (step 507).

$$\delta V_x, \delta V_y = \sqrt{\alpha \cdot \delta V1^2 + \beta \cdot \delta V2^2} \\ = \sqrt{0.1 \cdot \delta V1^2 + 0.9 \cdot \delta V2^2} \quad (12)$$

2) Vertical Speed Error Index Calculation Processing

Figure 14:
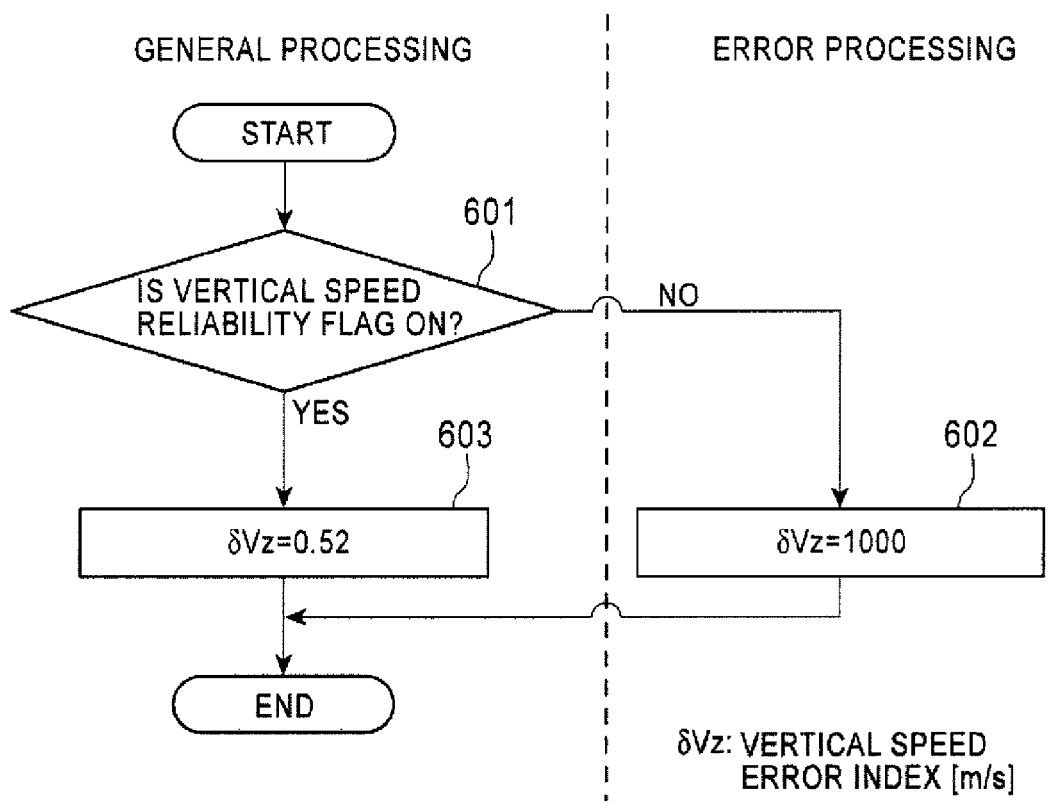
FIG. 14 is a vertical speed error index calculation processing flow.

FIG. 14 is a flowchart of a vertical speed error index calculation processing flow.

The vertical speed error index calculating unit 36 of the error index calculating unit 15b (FIG. 5) checks whether the vertical speed reliability flag is set to ON (step 601). If the flag is set to OFF, the accuracy is low, so the vertical speed error index calculating unit 36 sets the vertical speed error index δVz to 1000 m/s (step 602). However, if the vertical speed reliability flag is set to ON, factors related to an error are not found, and the vertical speed error index calculating unit 36 sets the vertical speed error index δVz to 0.52 m/s (step 603). This value is a statistical result.

3) GPS Latitude/Longitude Error Index Calculation Processing

Figure 15:
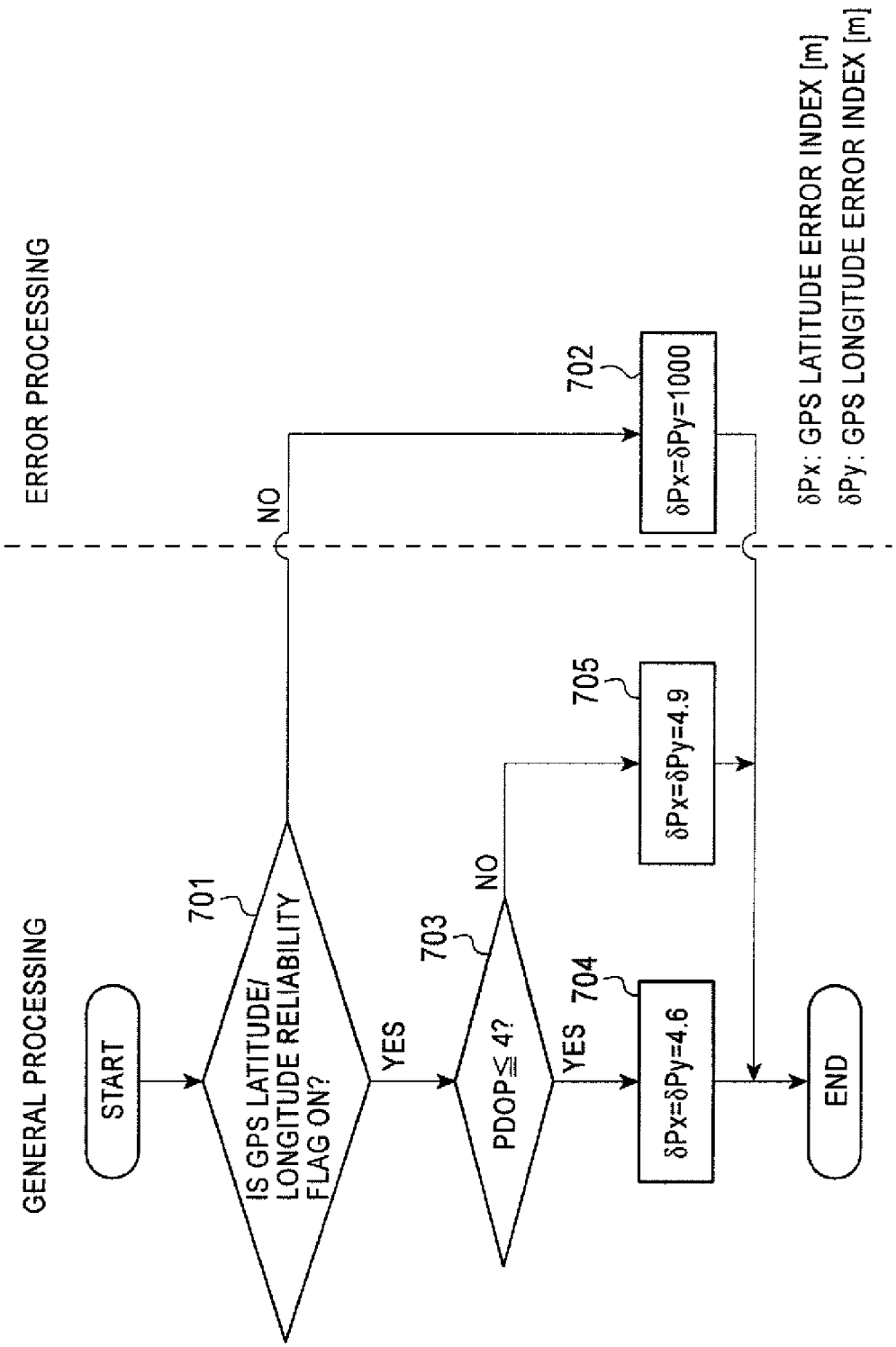
FIG. 15 is a GPS latitude/longitude error index calculation processing flow.

FIG. 15 is a flow of a GPS latitude/longitude error index calculation processing flow.

The GPS latitude/longitude error index calculating unit 37 of the error index calculating unit 15b (FIG. 5) determines whether the GPS latitude/longitude reliability flag is set to ON (step 701). If the flag is set to OFF, the accuracy is low, so the GPS latitude/longitude error index calculating unit 37 sets the GPS latitude error index δPx and the OPS longitude error index δPy to 1000 m/s (step 702). However, if the GPS latitude/longitude reliability flag is set to ON, the error indexes δPx and δPy are calculated using PDOP related to a horizontal position error as an error factor. The smaller the PDOP, the greater the accuracy. The GPS latitude/longitude error index calculating unit 37 determines whether PDOP≦4 (step 703). If PDOP≦4, the GPS latitude/longitude error indexes δPx and δPy are set to 4.6 m (step 704). If PDOP>4, the GPS latitude/longitude error indexes δPx and δPy are set to 4.9 m (step 705).

4) GPS Height Error Index Calculation Processing

Figure 16:
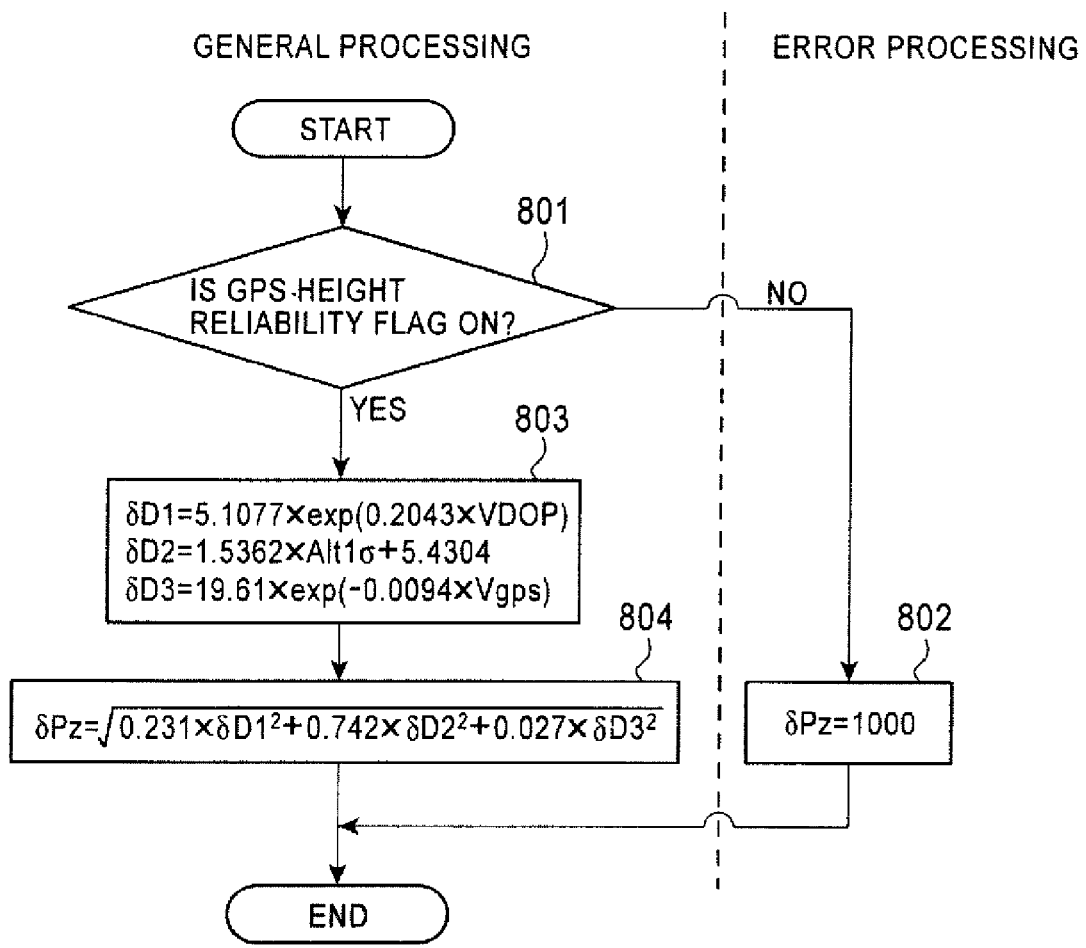
FIG. 16 is a GPS height error index calculation processing flow.

FIG. 16 is a flowchart of a GPS height error index calculation processing flow.

The GPS height error index calculating unit 38 of the error index calculating unit 15b (FIG. 5) determines whether the GPS height reliability flag is set to ON (step 801). If the flag is set to OFF, the accuracy is low, so the GPS height error index calculating unit 38 sets the GPS height error index δPz to 1000 m/s (step 802). However, if the GPS height reliability flag is set to ON, the GPS height error index calculating unit 38 calculates an error index based on the Expressions (13), (14), and (15) below by use of an error factor VDOP related to a height error, the height standard deviation (Alt1σ) over the past 4 seconds, and the GPS speed (Vgps) (step 803). That is, VDOP is a satellite position index in the vertical direction. The smaller the VDOP, the greater the accuracy. The GPS height error index calculating unit 38 calculates the VDOP-dependent GPS height error index 6D1 based on the following expression:

$$GPS \text{ height error index } \delta D1 = 5.1077 \times \exp(0.2043 \times VDOP) \quad (13)$$

Further, as the height standard deviation (Alt1σ) over the past 4 seconds varies less, its accuracy increases. The GPS height error index calculating unit 38 calculates the standard deviation (Alt1σ)-dependent GPS height error index δD2 based on the following expression:

$$GPS \text{ height error index } \delta D2 = 1.5632 \times Alt1\sigma + 5.4304 \quad (14)$$

Further, the greater the GPS speed (Vgps), the greater the accuracy. The GPS height error index calculating unit 38 calculates the GPS speed (Vgps)-dependent GPS height error index δD3 based on the following expression:

$$GPS \text{ height error index } \delta D3 = 19.61 \times \exp(-0.0094 \times Vgps) \quad (15)$$

Figure 17A:
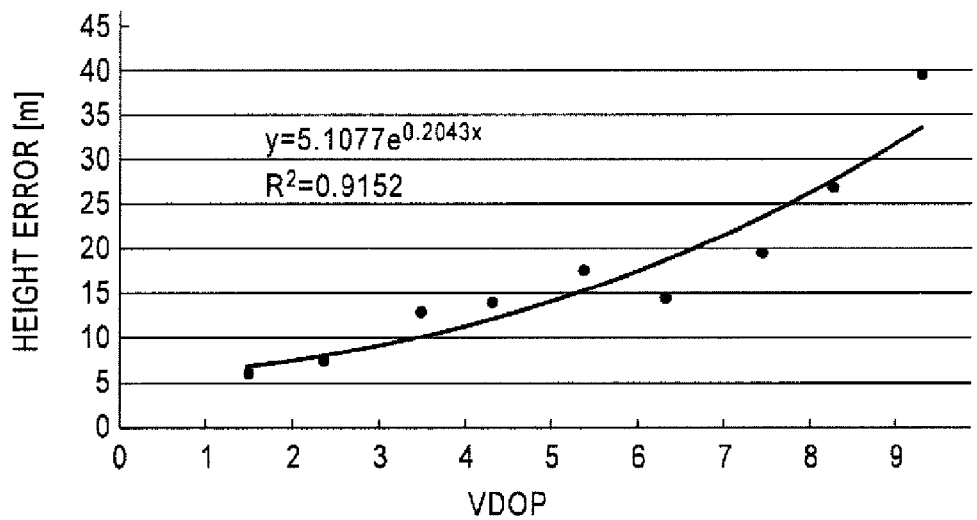
FIGS. 17A to 17C are explanatory views of how to set an approximation used for calculating a GPS height error index.
Figure 17B:
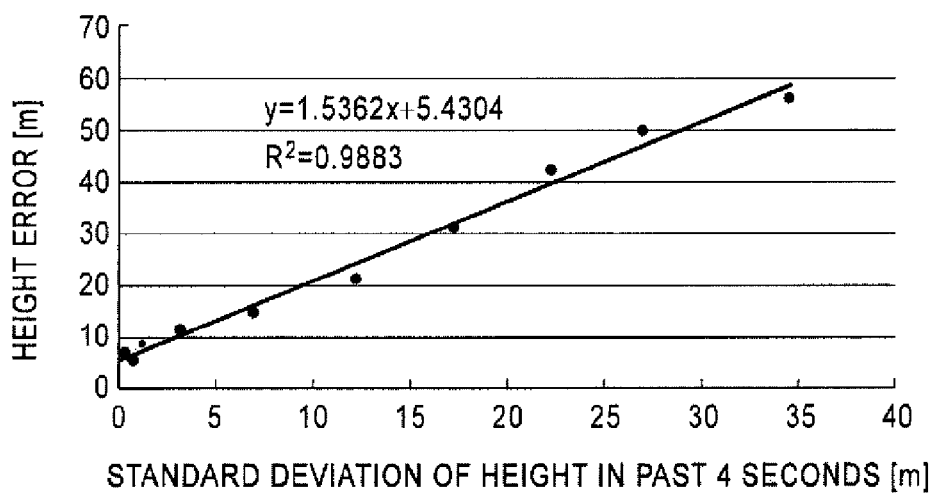
Figure 17C:
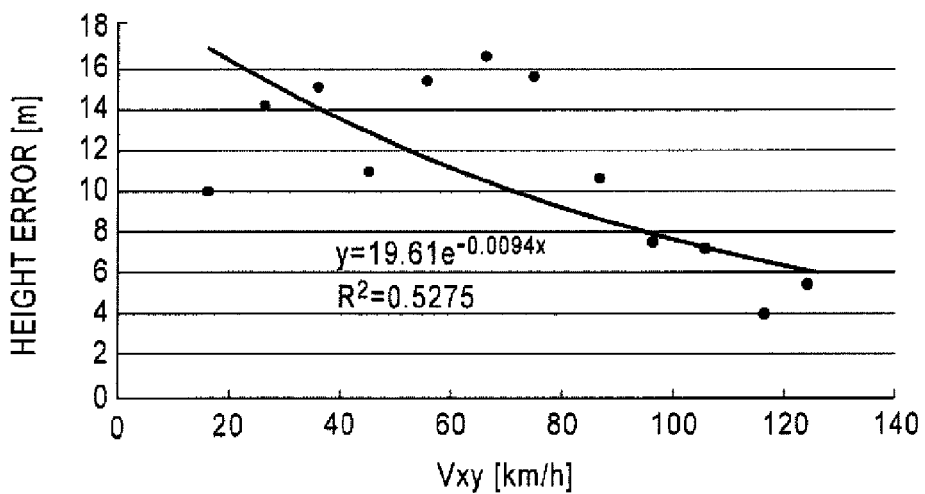

FIG. 17A shows an example where the relationship between a height error and VDOP is plotted based on the stored error data to set Expression (13) for approximating a height error index. FIG. 17B shows an example where the relationship between a height error and standard deviation (Alt1σ) is plotted based on the stored error data to set Expression (14) for approximating a height error index. FIG. 17C shows an example where the relationship between a height error and GPS speed (Vgps) is plotted based on the stored error data to set Expression (15) for approximating a height error index.

In step 803, the GPS height error indexes δD1 to δD3 are determined, then the GPS height error index calculating unit 38 adds weights of δD1 to 6D3 to calculate the height error index δPz based on the following expression (step 804):

$$\delta Pz = \sqrt{\alpha \cdot \delta D1^2 + \beta \cdot \delta D2^2 + \gamma \cdot \delta D3^2} \quad (16)$$
$$= \sqrt{0.231 \cdot \delta D1^2 + 0.742 \cdot \delta D2^2 + 0.027 \cdot \delta D3^2}$$

(D) Processing of Position Sensing Device

Figure 18:
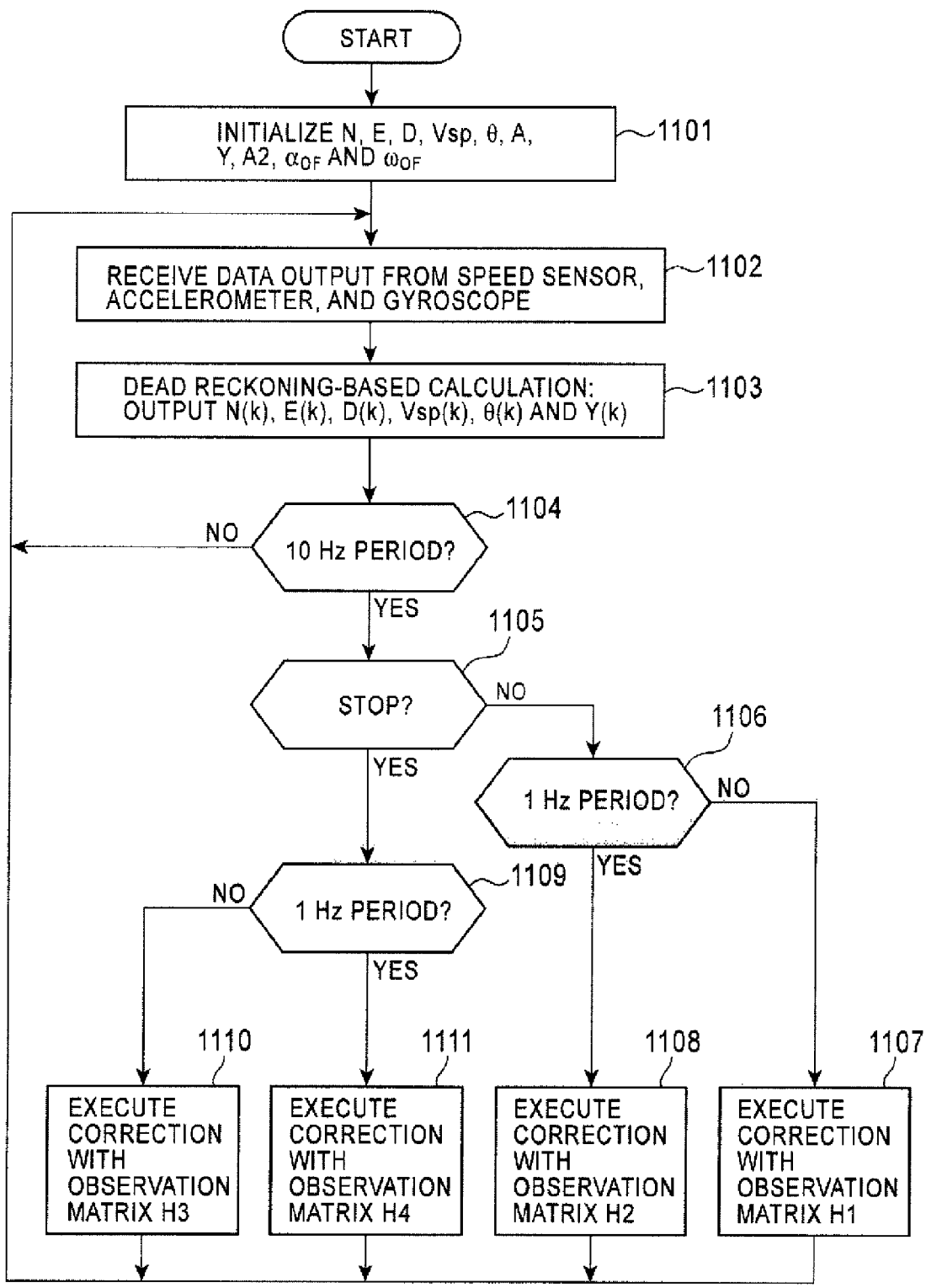
FIG. 18 is a flowchart of an overall processing flow of a position detecting unit.

FIG. 18 is a flowchart of an overall processing flow of the position sensing device of FIG. 2.

First, initial values of three-dimensional vehicle positions N, E, and D, a vehicle speed Vsp, a pitch angle θ, a sensor mounting pitch angle A, a yaw angle Y, a sensor mounting yaw angle A2, an offset $\omega_{OF}$ of the gyro 11b, and an offset $\alpha_{OF}$ of the acceleration sensor are set to the dead reckoning unit 12 (step 1101). Then, the dead reckoning unit 12 receives output values of the vehicle sensor 11a, the gyro 11b, and the acceleration sensor 11c (step 1102), and performs calculation based on Expressions (2), (3), and (5) in a first period (frequency of 25 Hz) to calculate a vehicle speed Vsp(k+1), and three-dimensional vehicle position (latitude N(k+1), longitude E(k+1), and height D(k+1)), and two values of the pitch angle θ and yaw angle Y:

cos θ(k+1)×cos Y(k+1)

cos θ(k+1)×sin Y(k+1)

The dead reckoning unit 12 outputs the calculation result (step 1103). Next, the dead reckoning unit 12 checks whether a current period is a second period (frequency of 10 Hz) (step 1104). If a current period is not a second period, the dead reckoning unit 12 repeats step 1102 and subsequent steps.

If a current period is a second period, the dead reckoning unit 12 determines whether a vehicle is stopped depending on whether the vehicle speed Vx is kept at 0 for 2 seconds or more (step 1105).

If the vehicle is not stopped, the dead reckoning unit 12 checks whether a current period is a third period (frequency of 1 Hz=GPS measurement period) (step 1106). If a current period is not a third period, the first correction unit 21 corrects the vehicle speed, the pitch angle θ, the sensor mounting pitch angle A, the sensor mounting yaw angle A2, the angular speed signal offset $\omega_{OF}$, and the acceleration signal offset $\alpha_{OF}$ through a Kalman filter process using the vehicle speed Vx calculated with the vehicle speed calculating unit 13 based on Expression (4) and the vehicle speed Vsp(k) calculated with the dead reckoning unit 12 based on Expression (2) (step 1107). In step 1107, the first correction processing is executed using an observation matrix H1 of the Kalman filter as described below.

In step 1106, if a current period is a third period, the second correction unit 22 corrects the vehicle position, the vehicle speed, the pitch angle θ, the sensor mounting pitch angle A, the yaw angle γ, the sensor mounting yaw angle A2, the angular speed signal offset $\omega_{OF}$, and the acceleration signal offset $\alpha_{OF}$ based on three-dimensional vehicle position N$_{GPS}$, E$_{GPS}$, and D$_{GPS}$) and vehicle speed (VN$_{GPS}$, VE$_{GPS}$, and VD$_{GPS}$), and error indexes output from the GPS receiver 14 (step 1108). In step 1108, the second correction processing is performed using an observation matrix H2 of a Kalman filter as described below.

Figure 19:
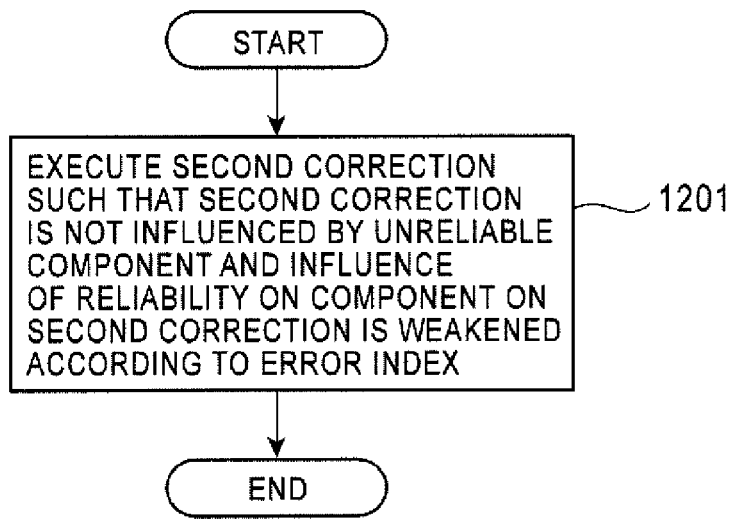
FIG. 19 is an explanatory view of the degree of contribution to correction processing for correcting a reliability and an error index.

In step 1108, the second correction unit 22 sets the degree of contribution of measurement component data determined to be unreliable to the correction processing to zero or almost zero as shown in step 1201 of FIG. 19. The second correction unit 22 performs the correction processing to reduce the degree of contribution of measurement component data determined to be reliable to the correction processing in accordance with an error index.

Figure 20:
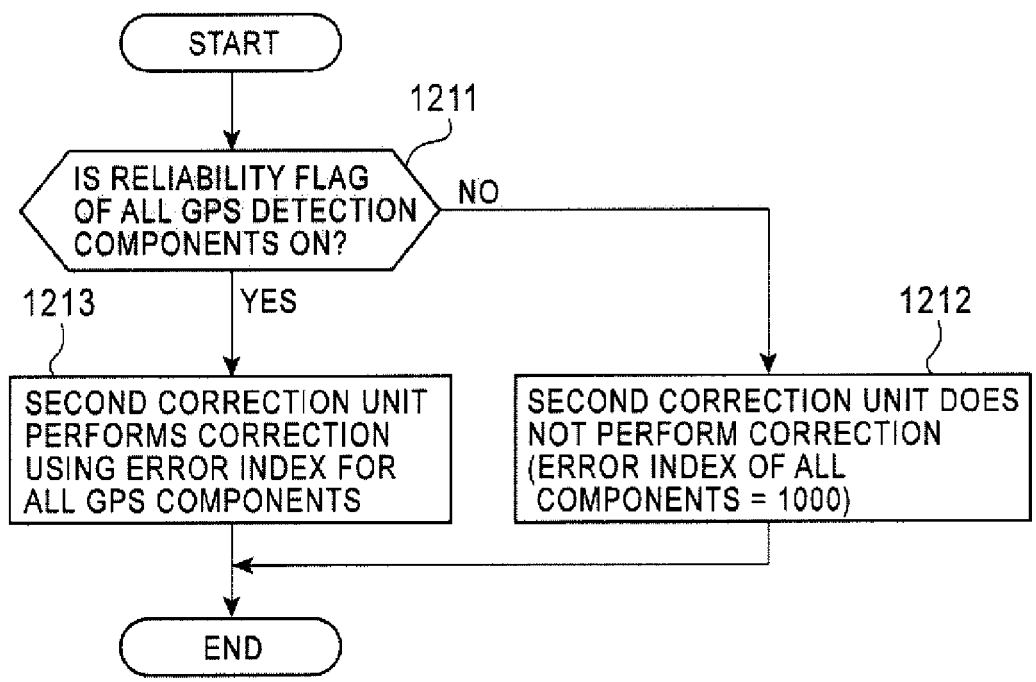
FIG. 20 is a flowchart of a processing flow for setting error indexes of all GPS measurement data to a large value to cancel correction processing if at least one of the GPS measurement data is determined to be unreliable, or performing correction processing if all GPS measurement data are determined to be reliable.

Alternatively, as shown in FIG. 20, if at least one of the GPS measurement component data is determined to be unreliable (NO in step 1211), the second correction unit 22 executes control not to perform the correction processing (step 1212). If all of the GPS measurement component data are determined to be reliable, the second correction unit 22 performs the correction processing and reduces the degree of contribution of each GPS measurement component data to the correction processing in accordance with an error index (step 1213). Through the above control, a system accuracy can be increased. To enable the control of FIG. 20, if at least one of the GPS measurement component data is determined to be unreliable, an error index of all UPS measurement component data is set to 1000.

Alternatively, the second correction unit 22 may divide the UPS measurement component data into a speed component group and a position component group in step 1108 as shown in FIG. 21 (step 1221). If at least one of the measurement components in a group is determined to be unreliable (NO in step 1222), the second correction unit 22 does not perform the correction processing using the measurement components in the group including the unreliable component (step 1223). However, if all measurement components in a group are determined to be reliable (YES in step 1222), the second correction unit 22 performs the correction processing using the measurement components in the group and reduces the degree of contribution of each measurement component to the correction processing in accordance with an error index (step 1224). A measurement accuracy of the GPS speed data of the GPS receiver is higher than the UPS position data thereof. Thus, the above control can increase the system accuracy. To enable the control of FIG. 21, if at least one of the GPS measurement component data is determined to be unreliable, an error index of all GPS measurement component data of a target group is set to 1000.

Referring back to FIG. 18, in step 1105, if a vehicle is stopped, it is determined whether a current period is a third period (frequency of 1 Hz=GPS measurement period) (step 1109). If a current period is not a third period, the first correction unit 21 performs the correction processing in step 1107 and corrects the angular speed offset based on a difference between an angular speed output signal of the gyro and an angular speed signal offset calculated with the dead reckoning unit 12 (step 1110). In step 1110, third correction processing is performed using an observation matrix H3 of a Kalman filter as described below.

In step 1109, if a current period is a third period, the second correction unit 22 performs the correction processing of step 1108 and corrects an angular speed offset based on a difference between an angular speed output signal of the gyro and an angular speed signal offset calculated with the dead reckoning unit 12 (step 1111). In step 1111, fourth correction processing is performed using an observation matrix H4 of a Kalman filter as described below.

According to the above processing, the first correction unit 21 corrects a cumulative error at a frequency higher than a frequency for correction of an estimated error with the GPS, so a position can be detected with higher accuracy.

Figure 22A:
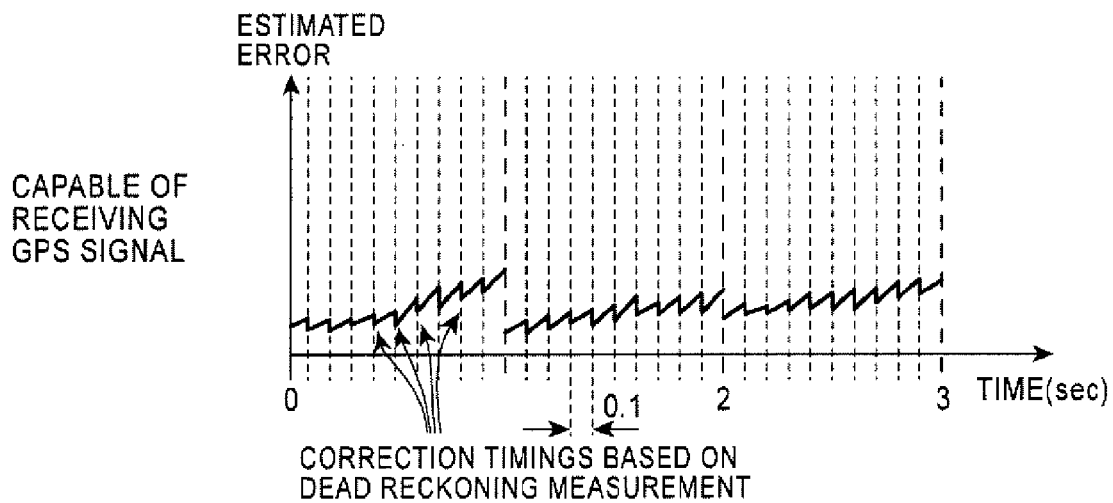
FIGS. 22A and 22B are explanatory views of an error in position detection at the time of receiving a GPS signal and at the time of receiving no GPS signal upon first and second correction processings.
Figure 22B:
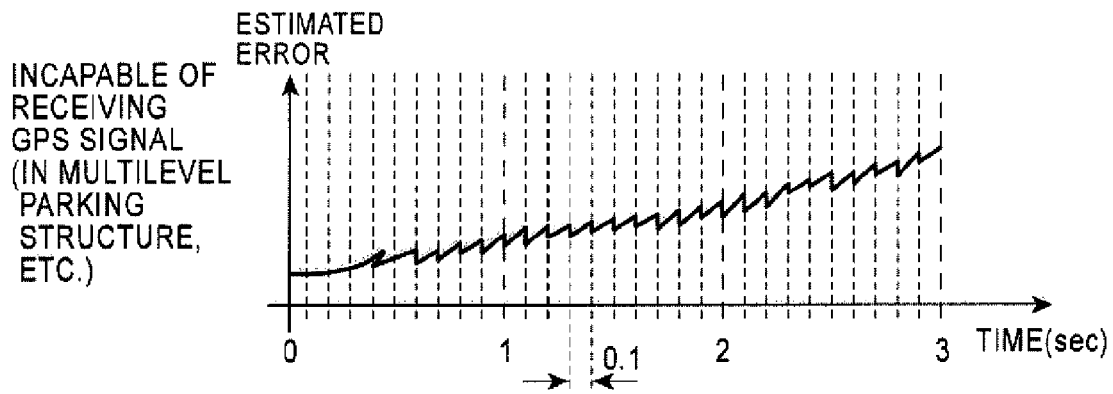

FIGS. 22A and 22B illustrate a position detection error at the time of receiving a UPS signal and at the time of receiving no GPS signal. As shown in FIG. 22A, at the time of receiving a GPS signal the first correction unit 21 corrects the pitch angle, the sensor mounting pitch angle, and the sensor mounting yaw angle at a frequency of 10 Hz. The second correction unit 22 performs correction at a frequency of 1 Hz (GPS measurement period), so a cumulative error can be reduced. As shown in FIG. 22B, even at the time of receiving no GPS signal, the first correction unit 21 corrects the pitch angle, the sensor mounting pitch angle, and the sensor mounting yaw angle at a frequency of 10 Hz, so a cumulative error can be decreased.

Figure 23:
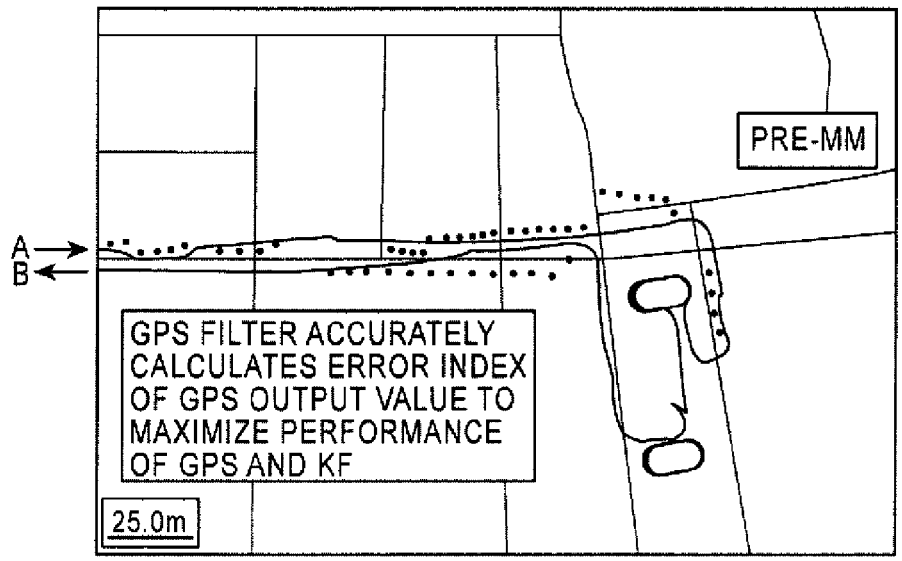
FIG. 23 is an explanatory view of vehicle movement path data in the case where a vehicle travels in the direction of an arrow A, makes several rounds in a multilevel parking structure, and then exits the structure in the direction of an arrow B.
Figure 24A:
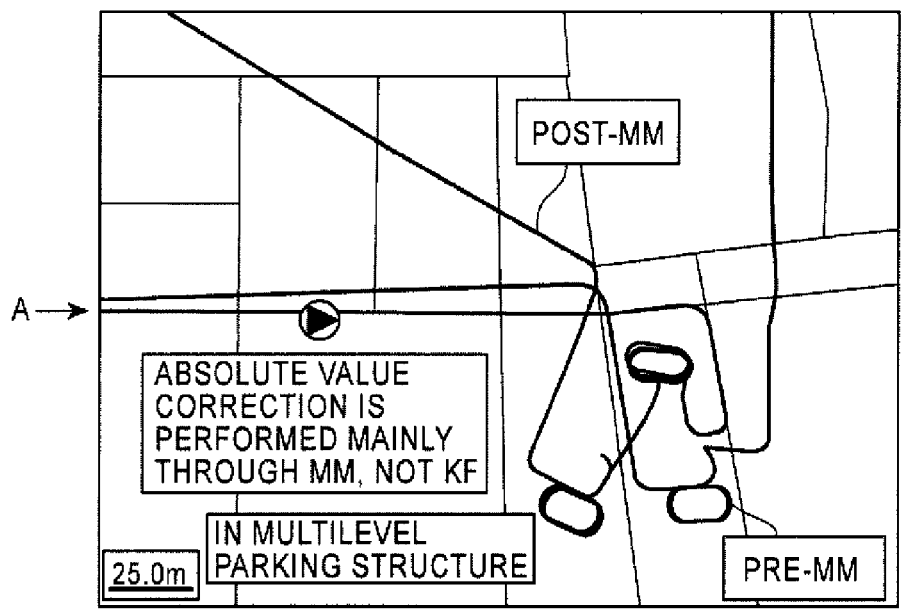
FIGS. 24A and 24B show an example of movement path data obtained with a conventional technique that executes correction mainly through map matching without using a Kalman filter processing unit, and an example of movement path data in the case where a Kalman filter processing unit is used, but an error index is incorrect or no error index is set.
Figure 24B:
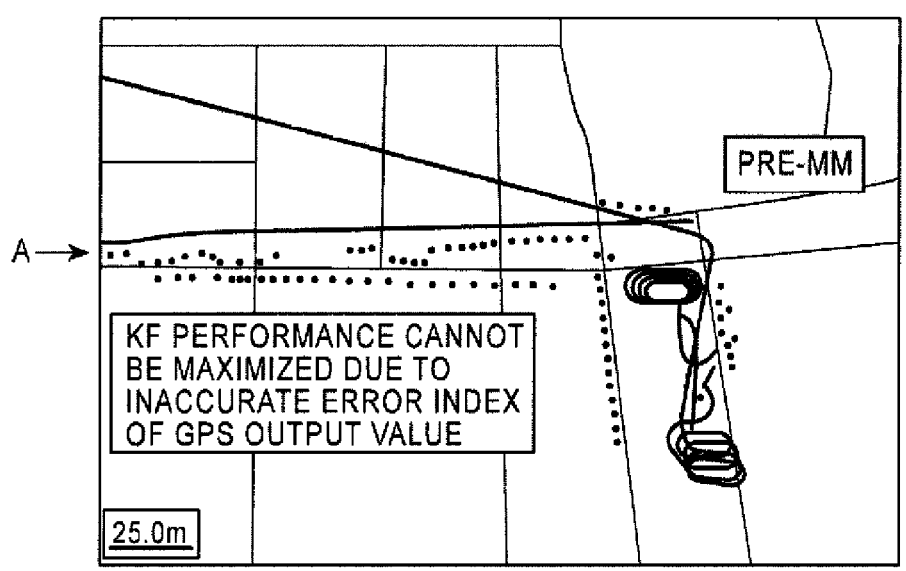

FIG. 23 illustrates vehicle movement path data according to the present invention in the case where a vehicle travels from the direction of an arrow A, makes several rounds in a multilevel parking structure, and then exits the structure in the direction of an arrow B. In FIG. 23, it is assumed that error indexes of the GPS measurement data are accurately calculated, and the GPS receiver and the Kalman filter processing unit maximize their functions. In this example, map matching MM is not carried out. FIG. 24A shows an example of vehicle movement path data obtained with a conventional technique, which is corrected mainly through map matching without using the Kalman filter processing unit 16. FIG. 24B shows an example of vehicle movement path data in the case where the Kalman filter processing unit 16 is used but an error index is not correct or no error index is determined. As apparent from FIG. 24B, if an error index is not correct or no error index is determined, a precise movement path cannot be obtained.

(E) Kalman Filter Processing

The Kalman filter processing is a method of successively determining the optimum estimated value at each time while correcting a difference between an estimated value and an observation value at each time. In the Kalman filter processing, a calculation expression for estimating a certain value is previously set, and processing for estimating a value is repeated up to time n when an observation value is obtained. If an observation value is obtained at time n, estimate value correction is performed to minimize a probabilistically defined error at the time n using the observation value.

Figure 25:
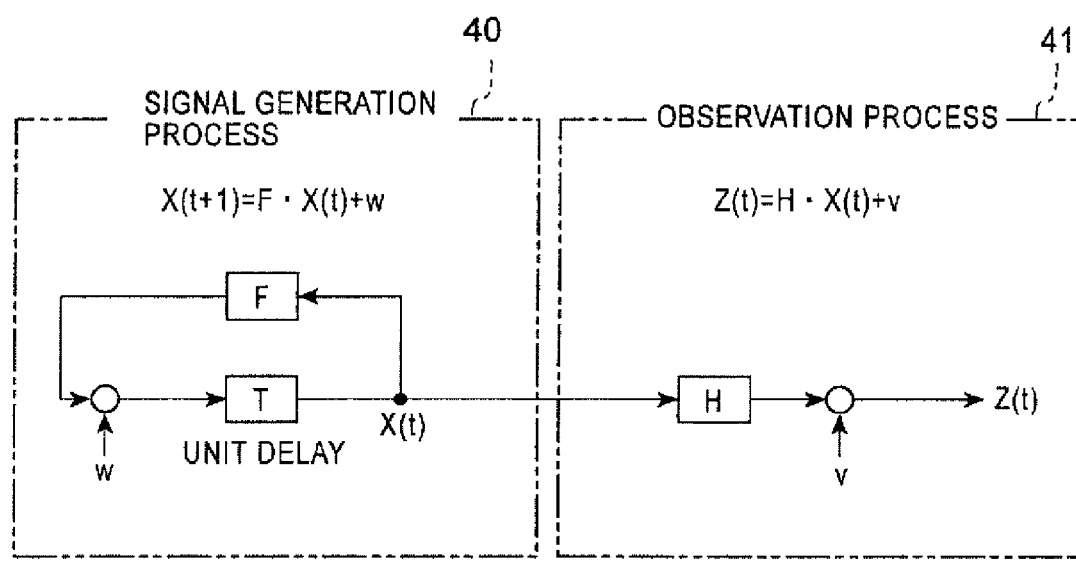
FIG. 25 is a schematic explanatory view of a Kalman filter process.

FIG. 25 is a schematic explanatory view of the Kalman filter processing. In the Kalman filer, as shown in FIG. 25, the processing is divided into a signal generation process 40 and an observation process 41. In FIG. 25, assuming that a linear system F is set with a state X(t), if a part of X(t) can be observed using the observation matrix H, the Kalman filter gives the optimum estimate value of X(t). In the following expression, w represents noise generated in the signal generation process, and v represents noise generated in an observation process. The Kalman filter repeatedly executes Kalman filter processing at predetermined intervals with an input Z(t) to determine the optimum estimate value X(t).

A state of the system model in the Kalman filter processing of the present invention is expressed by the following expression:

$$\Delta X(k+1) = F(k)\delta X(k) + w(k) \quad (17)$$

The system state variable $\delta X$ is derived from the following expression:

$$\Delta X = [\delta N, \delta E, \delta D, \delta Vbx, \delta C_{00}, \delta C_{10}, \delta C_{20}, \delta P_{00}, \delta P_{10}, \delta P_{20}, bwz, bax]$$

where Vbx=Vsp (see Expression (2)), bwz=$\omega_{OF}$, and bax=$\alpha_{OF}$. Further, parameters of $C_{00}$ to $P_{20}$ are elements of a coordinate transform matrix.

$$C_{00} = \cos\theta \cos Y$$

$$C_{10} = \cos\theta \sin Y$$

$$C_{20} = -\sin\theta$$

$$P_{00} = \cos A \cos A2$$

$$P_{10} = \cos A \sin A2$$

$$-P_{20} = -\sin A$$

The linear system F in Expression (17) can be expressed by a matrix of FIG. 26 based on the expression representing a system model of Expressions (2), (3), and (5), and components in bold parentheses are matrix elements. Here, $c_{ij}$ represents a coordinate transform matrix element for coordinate transform from a sensor coordinate system to a N-E-D coordinate system, and $p_{ij}$ represents a coordinate transform matrix element for coordinate transform from a sensor coordinate system to a vehicle fixed coordinate system, which are expressed by the following expressions:

$$\begin{bmatrix} c_{00} & c_{01} & c_{02} \\ c_{10} & c_{11} & c_{12} \\ c_{20} & c_{21} & c_{22} \end{bmatrix} = \begin{bmatrix} \cos\theta\cos Y & -\sin Y & \sin\theta\cos Y \\ \cos\theta\sin Y & \cos Y & \sin\theta\sin Y \\ -\sin\theta & 0 & \cos\theta \end{bmatrix}$$

$$\begin{bmatrix} p_{00} & p_{01} & p_{02} \\ p_{10} & p_{11} & p_{12} \\ p_{20} & p_{21} & p_{22} \end{bmatrix} = \begin{bmatrix} \cos A\cos A2 & -\sin A2 & \sin A\cos A2 \\ \cos A\sin A2 & \cos A2 & \sin A\sin A2 \\ -\sin A & 0 & \cos A \end{bmatrix}$$

Further, an observation expression of the Kalman filter of the present invention is as follows:

$$\Delta Z(k) = H(k)\delta X(k) + v(k) \quad (18)$$

In FIG. 27, a matrix portion (1) of the observation matrix H is used for calculating a speed error $\delta Vbx$ at a frequency of 10 Hz, a matrix portion (2) is used for calculating an angular speed offset error bwz for a parked vehicle at a frequency of 10 Hz, and a matrix portion (3) is used for calculating GPS vehicle position errors $\delta N$, $\delta E$, and $\delta D$ and vehicle speed errors δvnx, δvny, and δvnz at a frequency of 1 Hz. The observation matrix H is expressed as follows:

$$H = \begin{vmatrix} (1) \\ (2) \\ (3) \end{vmatrix}$$

where (1) represents the first line of the observation matrix H, (2) represents the second line of the observation matrix H, and (3) represents the third to eighth lines of the observation matrix H.

The Kalman filter calculates Z(t) (=δZ(t)) based on Expression (18) at a timing at which Z(t) (=δZ(t)) can be observed, and estimates X(t) (=δX(t)) based on a difference between a calculated value and an observation value. Then, X(t) is updated based on Expression (17) until the next value Z(t) is observed. After Z(t) is observed, the difference is calculated again, and X(t) (=δX(t)) is estimated based on the difference. Similar processing is repeated from then on.

A matrix portion (1) of the observation matrix H constitutes an observation matrix H1 of a Kalman filter used for the first correction processing in step 1107 of FIG. 18:

$$H1 = \begin{vmatrix} (1) \\ 0 \\ 0 \end{vmatrix}$$

Further, matrix portions (1) and (3) of the observation matrix H constitute an observation matrix H2 used for the second correction processing in step 1108 of FIG. 18:

$$H2 = \begin{vmatrix} (1) \\ 0 \\ (3) \end{vmatrix}$$

Further, matrix portions (1) and (2) of the observation matrix H constitute an observation matrix H3 of a Kalman filter used for third correction processing in step 1110 of FIG. 18:

$$H3 = \begin{vmatrix} (1) \\ (2) \\ 0 \end{vmatrix}$$

Further, matrix portions (1), (2), and (3) of the observation matrix H constitute an observation matrix H4 of a Kalman filter used for fourth correction processing in step 1111 of FIG. 18:

$$H4 = \begin{vmatrix} (1) \\ (2) \\ (3) \end{vmatrix}$$

The Kalman filter repeats calculation of Expression (19) below in a predetermined period (input period of Z(t)) with an input Z(t) to thereby determine the optimum estimate value X(t|t)(=δX(t|t)). Here, A(i|j) represents an estimate value of A at time i based on information obtained up to time j.

$$X(t|t)=(t|t-1)+K(t)[Z(t)-HX(t|t-1)] \quad (19)$$

where X(t|t−1) represents an estimate value, and K(t) represents a Kalman gain. The estimate value and the Kalman gain can be derived from the following expressions, respectively:

$$X(t|t-1)=FX(t-1|t-1) \quad (20)$$

$$K(t)=P(t|t-1)H^T(HP(t|t-1)H^T+V)^{-1} \quad (21)$$

The estimate value X(t|t−1) is updated based on Expression (20) in a period shorter than an input period of Z(t). Further, P represents an error covariance matrix of a state amount X, P(t|t−1) represents a predicted value of error covariance, and P(t−1|t−1) represents error covariance. These values are derived from the following expressions:

$$P(t|t-1)=FP(t-1|t-1)F^T+W$$

$$P(t-1|t-1)=(I-K(t-1)H)P(t-1|t-2)$$

V represents a variance component of noise v generated in the observation process, that is, a covariance matrix of an error of measurement, W represents a variance component of noise w generated in a signal generation process, superscript $(.)^T$ represents a transposed matrix, and $(.)^{-T}$ represents an inverse matrix. In addition, I represents a unit matrix, and V and W represent uncorrelated white Gaussian noise components with an average value of 0. In the above Kalman filter, an appropriate error is given to initial values of the state amount X and the error covariance P, and calculation of Expression (17) is repeatedly executed upon each measurement to thereby increase an accuracy of the state amount X.

(F) The Degree of Contribution of Error Index to Correction Processing of Kalman Filter A covariance matrix V of an error index is expressed by the following expression based on error indexes δPx, δPy, δPz, δVx, δVy, and δVz:

$$V = \begin{bmatrix} \delta Px^2 & & & & & \\ & \delta Py^2 & & & & \\ & & \delta Pz^2 & & 0 & \\ & & & \delta Vx^2 & & \\ & & 0 & & \delta Vy^2 & \\ & & & & & \delta Pz^2 \end{bmatrix} \quad (22)$$

As is apparent from the right side $(HP(t|t-1)H^T+V)^{-1}$ of Expression (21) for calculating a Kalman gain K(t), the degree of contribution of error indexes to the Kalman filter processing varies depending on the inverse of each error index. That is, the larger the error index, the lower the degree of contribution. The smaller the error index, the higher the degree of contribution. For example, in the covariance matrix V of the error index, if all GPS measurement components are determined to be unreliable, and all of the error indexes δPx, δPy, δPz, δVx, δVy, and δVz are set to 1000, $(HP(t|t-1)H^T+V)^{-1}$ is zero or almost zero. As a result, the Kalman gain K(t) is zero, and no correction is performed.

According to the present invention, no special GPS filter is provided, so any GPS receiver can utilize the Kalman filter complex system. That is, not only GPS receivers of a limited number of companies but also other GPS receivers can be used. Among these candidates, a GPS receiver of high cost performance may be used. Further, in the case of using the GPS receiver, the GPS filter can output an error index that is more reliable than that output from the GPS receiver or an error index that cannot be output from the GPS receiver, so system accuracy can be increased. Further, the degree of contribution of unreliable GPS measurement data to the Kalman filter correction processing can be set to zero, so system accuracy can be increased.

In the above embodiments, a Kalman filter is used to correct each parameter. However, a filtering system based on probability theory, such as an H infinity filter or a particle filter as well as the Kalman filter can be used for correction.

In the above description, the first and second correction processings are carried out with the Kalman filter processing unit, but the present invention also is applicable to the case of executing only the second correction processing with the GPS measurement data (while not executing the first correction processing).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A position sensing device for detecting a current position of a vehicle, comprising:
   a dead reckoning unit for determining a position of the vehicle by calculation based on dead reckoning at a predetermined cycle;
   a GPS receiver;
   a correction unit for executing correction processing for correcting a position determination result obtained through dead reckoning and for correcting a vehicle speed, a pitch angle, and a sensor mounting angle used in position determination executed through dead reckoning, wherein the correction processing is executed in accordance with multi-dimensional direction-specific positional components and speed components of the vehicle which are measured with the GPS receiver in a measurement period of the GPS receiver which is longer than the predetermined cycle; and
   a GPS data determination unit for determining a reliability of each of the multi-dimensional direction-specific positional components and speed components of the vehicle, which are measured with the GPS receiver, and calculating an error index of each component determined to be a reliable component,
   wherein the correction unit includes a unit for setting a degree of contribution of each measurement component determined to be an unreliable component to the correction processing to zero or almost zero, and reducing the degree of contribution of each measurement component determined to be a reliable component to the correction processing in accordance with a value of the error index.

2. The position sensing device according to claim 1, further comprising a second correction unit for measuring a vehicle speed using an output signal of a moving distance detecting sensor in a period longer than the predetermined cycle for dead reckoning and not longer than the GPS measurement period, and correcting the vehicle speed, the pitch angle, and the sensor mounting angle used in dead reckoning in accordance with a difference between the measured vehicle speed and the vehicle speed determined through dead reckoning.

3. The position sensing device according to claim 1, wherein the GPS data determination unit includes:
   a reliability determination unit for determining a reliability of each of direction-specific positional components and speed components measured with the GPS receiver; and
   an error index calculating unit for calculating an error index of a component determined to be a reliable component.

4. The position sensing device according to claim 3, wherein the error index calculating unit sets an error index of the component determined to be an unreliable component to a large value so as to minimize contribution of the component to the correction processing.

5. The position sensing device according to claim 3, wherein the correction unit executes the correction processing through a Kalman filter process, calculating a covariance matrix of a measurement error used for the Kalman filter process based on the error index, and reducing the degree of contribution of each measurement component to the correction processing in accordance with the error index based on the covariance matrix.

6. A position sensing device for detecting a current position of a vehicle, comprising:
   a dead reckoning unit for determining the vehicle's latitude, longitude, and position in a height direction at a first cycle based on a pitch angle θ and a yaw angle Y relative to a horizontal plane of a dead reckoning sensor that outputs a signal according to acceleration of the vehicle and an amount of change in orientation of the vehicle, a mounting angle of the dead reckoning sensor, and a vehicle moving distance detected with a vehicle moving distance detection unit, and calculating a vehicle speed, Vsp, by use of an acceleration signal output from the dead reckoning sensor;
   a GPS receiver;
   a first correction unit for calculating a vehicle speed, Vx, at a second cycle not shorter than the first cycle using an output signal of the moving distance detecting unit, and correcting the vehicle speed, Vsp, the pitch angle θ, and the mounting angle of the sensor, which are calculated with the dead reckoning unit, based on a difference between the calculated vehicle speed, Vx, and the vehicle speed calculated with the dead reckoning unit, Vsp,; and
   a second correction unit for correcting the vehicle's latitude, longitude, and position in a height direction, and a vehicle speed calculated with the dead reckoning unit at a third cycle not shorter than the second cycle, and the pitch angle 0, the yaw angle Y, and the mounting angle of the sensor based on a vehicle's latitude, longitude, and position in the height direction, and a vehicle speed output from the GPS receiver, and a vehicle's latitude, longitude, and position in the height direction, and a vehicle speed output from the dead reckoning unit, and a sensor offset value thereof; and
   a GPS data determination unit for determining a reliability of each of multi-dimensional direction-specific positional components and speed components of the vehicle, which are measured with the GPS receiver, and calculating an error index of each component determined to be a reliable component,
   wherein the second correction unit includes a unit for setting a degree of contribution of each measurement component determined to be an unreliable component to the correction processing to zero or almost zero, and reducing the degree of contribution of each measurement component determined to be a reliable component to the correction processing in accordance with a value of the error index.

7. The position sensing device according to claim 6, wherein the GPS data determination unit includes:

a reliability determination unit for determining a reliability of each of direction-specific positional components and speed components measured with the GPS receiver; and an error index calculating unit for calculating an error index of a component determined to be a reliable component.

8. The position sensing device according to claim 7, wherein the error index calculating unit sets an error index of the component determined to be an unreliable component to a large value so as to minimize contribution of the component to the correction processing.

9. A position sensing device for detecting a current position of a vehicle, comprising:

a dead reckoning unit for determining a position of the vehicle by calculation based on dead reckoning at a predetermined cycle;

a GPS receiver;

a correction unit for executing correction processing for correcting a position determination result obtained through dead reckoning and for correcting a vehicle speed, a pitch angle, and a sensor mounting angle used in position determination executed through dead reckoning, wherein the correction processing is executed in accordance with multi-dimensional direction-specific positional components and speed components of the vehicle which are measured with the GPS receiver in a measurement period of the GPS receiver which is longer than the predetermined cycle; and a GPS data determination unit for determining a reliability of each of the multi-dimensional direction-specific positional components and speed components of the vehicle, which are measured with the GPS receiver, and calculating an error index of a component determined to be a reliable component, wherein the correction unit includes:

a unit for executing control not to perform the correction processing if at least one of the measurement components is determined to be an unreliable component; and a unit for executing the correction processing and reducing a degree of contribution of each measurement component to the correction processing in accordance with a value of the error index if all measurement components are determined to be a reliable component.

10. A position sensing device for detecting a current position of a vehicle, comprising:

a dead reckoning unit for determining a position of the vehicle by calculation based on dead reckoning at a predetermined cycle;

a GPS receiver;

a correction unit for executing correction processing for correcting a position determination result obtained through dead reckoning and for correcting a vehicle speed, a pitch angle, and a sensor mounting angle used in position determination executed through dead reckoning, wherein the correction processing is executed in accordance with multi-dimensional direction-specific positional components and speed components of the vehicle which are measured with the GPS receiver in a measurement period of the GPS receiver which is longer than the predetermined cycle; and a GPS data determination unit for determining a reliability of each of the multi-dimensional direction-specific positional components and speed components of the vehicle, which are measured with the GPS receiver, and calculating an error index of a component determined to be a reliable component, wherein the correction unit includes:

a unit for executing, if GPS measurement components are divided into a speed component group and a positional component group, and at least one of the measurement components in a group is determined to be an unreliable component, control not to perform the correction processing by use of the measurement components in the group including the unreliable component; and a unit for executing, if all measurement components in a group are determined to be a reliable component, the correction processing by use of the measurement components in the group and reducing a degree of contribution of each measurement component to the correction processing in accordance with a value of the error index.

* * * * *